US012666357B2

(12) United States Patent　　　　　(10) Patent No.:　　US 12,666,357 B2
　　Babaei　　　　　　　　　　　　　　　(45) Date of Patent:　　　Jun. 23, 2026

(54) METHOD, APPARATUS AND SYSTEM FOR NETWORK ENERGY SAVING

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 18/370,347

(22) Filed: Sep. 19, 2023

(65) Prior Publication Data

US 2024/0098636 A1　　Mar. 21, 2024

Related U.S. Application Data

(60) Provisional application No. 63/408,066, filed on Sep. 19, 2022.

(51) Int. Cl.
　　H04W 52/02　　　　(2009.01)
(52) U.S. Cl.
　　CPC ................................ H04W 52/0212 (2013.01)
(58) Field of Classification Search
　　CPC .......... H04W 52/0212; H04W 52/0206; Y02D
　　　　　　　　　　　　　　　　　　　　　　30/70
　　See application file for complete search history.

(56) References Cited

U.S. PATENT DOCUMENTS

2024/0023195 A1 *　1/2024　Kim ...................... H04W 76/28
2024/0049250 A1 *　2/2024　Cozzo ................. H04W 72/232
2024/0373431 A1 *　11/2024　Marinier ............... H04W 72/21

OTHER PUBLICATIONS

3GPP TSG RAN WG1 #110; R1-2206697; e-Meeting, Aug. 22-Aug. 26, 2022; Source: China Telecom; Title: Discussion on network energy saving techniques; Agenda Item: 9.7.2; Document for: Discussion.
3GPP TSG RAN WG1 #110; R1-2206839; Toulouse, France, Aug. 22-26, 2022; Agenda item: 9.7.2; Source: Samsung; Title: Network energy saving techniques; Document for: Discussion and decision.
3GPP TSG RAN WG1 #110; R1-2206926; Toulouse, France, Aug. 22-26, 2022; Agenda item: 9.7.2; Title: Discussion on network energy saving techniques; Source: CMCC; Document for: Discussion and Decision.
3GPP TSG RAN WG1 Meeting #110; R1-2206947; Toulouse, Aug. 22-26, 2022; Agenda item: 9.7.2; Title: On Network Energy Saving Techniques; Source: Fraunhofer IIS, Fraunhofer HHI; Document for: Discussion.
3GPP TSG RAN WG1 #110; R1-2206980; Toulouse, France, Aug. 22-Aug. 26, 2022; Source: MediaTek Inc.; Title: Network energy saving techniques; Agenda item: 9.7.2; Document for: Discussion.
3GPP TSG RAN WG1 #110; R1-2207038; Toulouse, France, Aug. 22-26, 2022; Agenda Item: 9.7.2; Source: LG Electronics; Title: Discussion on physical layer techniques for network energy savings; Document for: Discussion and decision.
3GPP TSG RAN WG1 meeting #110; R1-2207060; Toulouse, France, Aug. 22-26, 2022; Title: Discussion on NW energy saving techniques; Source: ZTE, Sanechips; Agenda Item: 9.7.2; Document for: Discussion and Decision.

(Continued)

*Primary Examiner* — Jae Y Lee
*Assistant Examiner* — Nhu Pham
(74) *Attorney, Agent, or Firm* — Alireza Babaei

(57)　　　　　　　ABSTRACT

A wireless device may transmit a wake up request indicating a request to exit an energy saving state for one or more cells. At least one uplink transmission or at least one downlink transmission is not performed during an energy saving state.

20 Claims, 19 Drawing Sheets

(56) References Cited

OTHER PUBLICATIONS

3GPP TSG RAN WG1 Meeting #110; R1-2207074; Toulouse, Aug. 22-26, 2022; Agenda Item: 9.7.2; Source: CEWIT; Title: Discussion on Network energy saving techniques; Document for: Discussion.
3GPP TSG RAN WG1 #110; R1-2207119; Toulouse, France, Aug. 22-26, 2022; Source: Rakuten Mobile Inc.; Title: Discussion on network energy saving techniques; Agenda: 9.7.2; Document for: Discussion and Decision.
3GPP TSG RAN WG1 #110; R1-2207246; Toulouse, France, Aug. 22-Aug. 26, 2022; Agenda item: 9.7.2; Source: Qualcomm Incorporated; Title: Network energy saving techniques; Document for: Discussion/Decision.
3GPP TSG RAN WG1 #110; R1-2207344; Toulouse, France, Aug. 22-26, 2022; Agenda Item: 9.7.2; Source: Apple; Title: Discussion on network energy saving techniques; Document for: Discussion/Decision.
3GPP TSG RAN WG1 #110; R1-2207419; Toulouse, France, Aug. 22-26, 2022; Source: NTT Docomo, Inc.; Title: Discussion on NW energy saving techniques; Agenda Item: 9.7.2; Document for: Discussion and Decision.
3GPP TSG RAN WG1 #110; R1-2207438; Toulouse, France, Aug. 22-26, 2022; Agenda Item: 9.7.2; Source: Ericsson; Title: Network energy saving techniques; Document for: Discussion and Decision.
3GPP TSG RAN WG1 #110; R1-2207446; Toulouse, France, Aug. 22-26, 2022; Agenda item: 9.7.2; Source: TRI; Title: Discussion on potential L1 network energy saving techniques for NR; Document for: Discussion and Decision.
3GPP TSG RAN WG1 #110; R1-2207481; Toulouse, France, Aug. 22-26, 2022; Agenda item: 9.7.2; Source: KT Corp.; Title: Discussion on network energy saving techniques; Document for: Discussion and decision.
3GPP TSG-RAN WG2 Meeting #119 Electronic; R2-2207116; Elbonia, Aug. 17-26, 2022; Agenda item: 8.3.2; Source: Intel Corporation; Title: Additional UE assistance information and UE feedback; WID/SID: FS_Netw_Energy_NR; Document for: Discussion and Decision.
3GPP RAN WG2 Meeting #119-e; R2-2207247; Online, Aug. 17-26, 2022; Agenda Item: 8.3.2; Source: InterDigital; Title: Frequency domain and UE assistance NES techniques; Document for: Discussion, Decision.
3GPP TSG-RAN WG2 #119e; R2-2207292; Electronic meeting, Aug. 17-26, 2022; Agenda item: 8.3.2 gNB and UE supporting techniques; Title: Finer granularity configuration for NES; Source: NEC; Document for: Discussion and Decision.
3GPP TSG-RAN WG2 #119e; R2-2207293; Electronic meeting, Aug. 17-26, 2022; Agenda item: 8.3.2 gNB and UE supporting techniques; Title: Assistance information to support choice of NES configuration; Source: NEC; Document for: Discussion and Decision.
3GPP TSG-RAN WG2 Meeting #119 electronic; R2-2207406; Online, Aug. 17-29, 2022; Agenda item: 8.3.2; Source: Fujitsu; Title: Consideration on network energy saving; Document for: Discussion and decision.
3GPP TSG RAN WG2 Meeting #119-e; R2-2207423; E-Conference, Aug. 17-26, 2022; Agenda item: 8.3.2; Source: Apple; Title: Initial discussion on RAN2 work of Network energy saving; WID/SID: FS_Netw_Energy_NR-Release 18; Document for: Discussion and Decision.
3GPP TSG-RAN WG2 Meeting #119-e; R2-2207511; Electronic, Aug. 17-26, 2022; Source: CATT; Title: Network energy savings: issues for investigation in RAN2; Agenda Item: 8.3.2; Document for: Discussion and Decision.
3GPP TSG-RAN WG2 Meeting #119 Electronic; R2-2207545; Elbonia, Aug. 17-26, 2022; Agenda item: 8.3.2; Source: Nokia, Nokia Shanghai Bell; Title: NW Energy Saving; WID/SID: FS_Netw_Energy_NR—Release 18; Document for: Discussion and Decision.
3GPP TSG-RAN WG2 Meeting #119 electronic; R2-2207787; E-Meeting, Aug. 17-Aug. 29, 2022; Agenda Item: 8.3.2; Source: vivo; Title: Discussion on frequency domain and UE-assisted Net-work Energy saving techniques; Document for: Discussion and Decision.
3GPP TSG-RAN WG2 #119-e; R2-2207800; E-meeting, Aug. 2022 ; Agenda Item: 8.3.2; Source: OPPO; Title: Discussion on the UE assistance information; Document for: Discussion, Decision.
3GPP TSG-RAN WG2 Meeting #119 electronic; R2-2207919; Online, Aug. 17-Aug. 26, 2022; Agenda item: 8.3.2; Source: Lenovo; Title: Discussion on supporting of network energy savings for NR; Document for: Discussion and Decision.
3GPP TSG-RAN WG2 Meeting #119 electronic; R2-2207920; Online, Aug. 17-Aug. 26, 2022; Agenda item: 8.3.2; Source: Lenovo; Title: Discussion on the state transition in NES; Document for: Discussion and Decision.
3GPP TSG-RAN WG2 #119e; Tdoc R2-2208031; Electronic meeting, Aug. 15-26, 2022; Agenda Item: 8.3.2; Source: Ericsson; Title: Miscellaneous mechanisms for network energy savings; Document for: Discussion, Decision.
3GPP TSG-RAN WG2 #119-e; R2-2208233; Online meeting, Aug. 17-29, 2022; Title: gNB operation for NES; Source: ETRI; Agenda item: 8.3.2; Document for: Discussion.
3GPP TSG-RAN WG2 Meeting#119-e; R2-2208330; Electronic, Aug. 17-29, 2022; Source: ZTE corporation, Sanechips; Title: Supporting access via assistant cell for network energy saving; Agenda item: 8.3.2; Document for: Discussion and Decision.
3GPP TSG-RAN WG2 Meeting #119 electronic; R2-2208432; Online, Aug. 17-26, 2022; Agenda item: 8.3.2; gNB and UE supporting techniques; Source: CMCC; Title: Analysis on power consumption in base station; WID/SID: Network energy savings for NR; Document for: Discussion and Decision.
3GPP TSG-RAN WG2 Meeting #119-e; R2-2208592; Online, Aug. 17-Aug. 29, 2022; Agenda item: 8.3.2; Source: Samsung; Title: Feedback and Assistance Information for NES; Document for: Discussion & Decision.
3GPP TS 38.211 V17.2.0 (Jun. 2022); Technical Specification; 3rd Generation Partnership Project; Technical Specification Group Radio Access Network; NR; Physical channels and modulation; (Release 17).
3GPP TS 38.212 V17.2.0 (Jun. 2022); Technical Specification; 3rd Generation Partnership Project; Technical Specification Group Radio Access Network; NR; Multiplexing and channel coding; (Release 17).
3GPP TS 38.213 V17.2.0 (Jun. 2022); Technical Specification; 3rd Generation Partnership Project; Technical Specification Group Radio Access Network; NR; Physical layer procedures for control; (Release 17).
3GPP TS 38.214 V17.2.0 (Jun. 2022); Technical Specification; 3rd Generation Partnership Project; Technical Specification Group Radio Access Network; NR; Physical layer procedures for data; (Release 17).
3GPP TS 38.300 V17.1.0 (Jun. 2022); Technical Specification; 3rd Generation Partnership Project; Technical Specification Group Radio Access Network; NR; NR and NG-RAN Overall Description; Stage 2; (Release 17).
3GPP TS 38.321 V17.1.0 (Jun. 2022); Technical Specification; 3rd Generation Partnership Project; Technical Specification Group Radio Access Network; NR; Medium Access Control (MAC) protocol specification; (Release 17).
3GPP TS 38.331 V17.1.0 (Jun. 2022); Technical Specification; 3rd Generation Partnership Project; Technical Specification Group Radio Access Network; NR; Radio Resource Control (RRC); Protocol specification; (Release 17).
3GPP TSG RAN WG1 Meeting #109-e; R1-2203173; e-Meeting, May 9-May 20, 2022; Agenda item: 9.7.2; Source: Huawei, HiSilicon; Title: Discussion on network energy saving techniques; Document for: Discussion and decision.
3GPP TSG RAN WG1 Meeting#109-e; R1-2203225; e-Meeting, May 9-20, 2022; Agenda item: 9.7.2; Source: Nokia, Nokia Shanghai Bell; Title: Network Energy Saving Techniques; Document for: Discussion and Decision.
3GPP TSG RAN WG1 Meeting #109-e; R1-2203342; e-Meeting, May 9-20, 2022; Agenda Item: 9.7.2; Source: Spreadtrum Communications; Title: Discussion on network energy saving techniques; Document for: Discussion and decision.

(56)                    References Cited

OTHER PUBLICATIONS

3GPP TSG RAN WG1 #109-e; R1-2203482; e-Meeting, May 9-20, 2022; Source: CATT; Title: Network Energy Saving techniques in time, frequency, and spatial domain; Agenda Item: 9.7.2; Document for: Discussion and Decision.

3GPP TSG RAN WG1 #109-e; R1-2203576; e-Meeting, May 9-20, 2022; Source: vivo; Title: Discussions on hetwork energy saving techniques; Agenda Item: 9.7.2; Document for: Discussion and Decision.

3GPP TSG RAN WG1 meeting #109-e; R1-2203604; e-Meeting, May 9-20, 2022; Title: Discussion on NW energy saving techniques; Source: ZTE, Sanechips; Agenda Item: 9.7.2; Document for: Discussion and Decision.

3GPP TSG RAN WG1 Meeting #109-e; R1-2203636; e-Meeting, May 9-20, 2022; Agenda item: 9.7.2; Title: On Network Energy Saving Techniques; Source: Fraunhofer IIS, Fraunhofer HHI; Document for: Discussion.

3GPP TSG RAN WG1 #109-e; R1-2203663; e-Meeting, May 9-May 20, 2022; Source: China Telecom; Title: Discussion on network energy saving techniques; Agenda Item: 9.7.2; Document for: Discussion.

3GPP TSG RAN WG1 #109; R1- 2203831; e-Meeting, May 9-20, 2022; Agenda item: 9.7.1; Source: Xiaomi; Title: Discussions on performance evaluation of network energy saving; Document for: Discussion.

3GPP TSG RAN WG1 #109-e; R1-2203920; e-Meeting, May 9-20, 2022; Agenda item: 9.7.2; Source: Samsung Title: Network energy saving techniques; Document for: Discussion and decision.

3GPP TSG RAN WG1 #109-e; R1-2203936; e-Meeting, May 9-20, 2022; Agenda item: 9.7.2; Source: NEC; Title: Discussion on network energy saving techniques; Document for: Discussion and Decision.

3GPP TSG RAN WG1 #109-e; R1-2204010; e-Meeting, May 9-20, 2022; Source: OPPO; Title: Study on network energy saving techniques; Agenda Item: 9.7.2; Document for: Discussion and Decision.

3GPP TSG-RAN WG1 #109-e; R1-2204043; e-Meeting, May 9-20, 2022; Agenda item: 9.7.2; Source: CENC; Title: Discussion on network energy saving techniques; Document for: Discussion.

3GPP TSG-RAN WG1 #109-e; R1-2204074; e-Meeting, May 9-20, 2022; Agenda Item: 9.7.2; Source: Panasonic; Title: Discussion on potential network energy saving techniques; Document for: Discussion/Decision.

3GPP TSG RAN WG1 Meeting #109-e; R1-2204101; e-Meeting, May 9-20, 2022; Agenda Item: 9.7.2; Source: FUTUREWEI; Title: Potential enhancements for network energy saving; Document for: Discussion and decision.

3GPP TSG RAN WG1 #109-e; R1-2204257; e-Meeting, May 9-20, 2022; Agenda Item: 9.7.2; Source: Apple; Title: Discussion on Network energy saving techniques; Document for: Discussion/Decision.

3GPP TSG RAN WG1 #109-e; R1-2204319; e-Meeting, May 9-20, 2022; Agenda item: 9.7.2; Title: Discussion on hetwork energy saving techniques; Source: CMCC; Document for: Discussion and Decision.

3GPP TSG RAN WG1 #109-e; R1-2204392; e-Meeting, May 9-20, 2022; Source: NTT Docomo, Inc .; Title: Discussion on NW energy saving techniques; Agenda Item: 9.7.2; Document for: Discussion and Decision.

3GPP TSG RAN WG1 Meeting #109-e; R1-2204424; e-Meeting, May 9-20, 2022; Agenda item: 9.7.2; Source: Lenovo; Title: Network energy saving techniques; Document for: Discussion.

3GPP TSG RAN WG1 #109-e; R1-2204443; e-Meeting, May 9-20, 2022; Agenda item: 9.7.2 Network energy saving techniques; Source: ITRI; Title: Study on potential L1 network energy saving techniques for NR; Document for: Discussion and Decision.

3GPP TSG RAN WG1 #109-e; R1-2204629; e-Meeting, May 9-20, 2022; Agenda Item: 9.7.2; Source: LG Electronics; Title: Discussion on physical layer techniques for network energy savings; Document for: Discussion and decision.

3GPP TSG RAN WG1 #109-e; R1-2204687; e-Meeting, May 9-May 20, 2022; Source: MediaTek Inc.; Title: Network energy saving techniques; Agenda item: 9.7.2; Document for: Discussion.

3GPP TSG RAN WG1 Meeting #109-e; R1-2204756; May 9-May 20, 2022; Agenda Item: 9.7.2; Source: Cewit, IIT-M, IIT-K, Reliance Jio, Saankhya Labs; Title: Network energy saving techniques; Document for: Discussion.

3GPP TSG RAN WG1 Meeting #109-e; R1-2204812; e-Meeting, May 9-20, 2022; Source: Intel Corporation; Title: Discussion on Network Energy Saving Techniques; Agenda item: 9.7.2; Document for: Discussion.

3GPP TSG RAN WG1 #109-e; R1-2204832; e-Meeting, May 9-20, 2022; Agenda Item: 9.7.2; Source: InterDigital, Inc.; Title: Potential techniques for network energy saving; Document for: Discussion and Decision.

3GPP TSG RAN WG1 #109-e; R1-2204882; e-Meeting, May 9-20, 2022; Agenda Item: 9.7.2; Source: Ericsson Title: Network energy saving techniques; Document for: Discussion and Decision.

3GPP TSG RAN WG1 #109-e; R1-2205046; e-Meeting, May 9-20, 2022; Agenda item: 9.7.2; Source: Qualcomm Incorporated; Title: Network energy saving techniques; Document for: Discussion/Decision.

3GPP TSG RAN WG1 #109-e; R1-2205070; e-Meeting, May 9-May 20, 2022; Source: Rakuten Mobile Inc .; Title: Potential Techniques of Network Energy Savings; Agenda: 9.7.2; Document for: Discussion.

3GPP TSG RAN WG1 #110; R1- 2206242; Toulouse, Aug. 22-26, 2022; Agenda item: 9.7.2; Source: NEC; Title: Discussion on network energy saving techniques; Document for: Discussion and Decision.

3GPP TSG RAN WG1 #109-e; R1- 2205084; e-Meeting, May 9-20, 2022; Agenda Item: 9.7.2; Source: Fujitsu; Title: Initial Views on Network Energy Saving Techniques; Document for: Discussion/Decision.

3GPP TSG RAN WG1 Meeting #110; R1-2205756; Toulouse, France, Aug. 22-26, 2022; Agenda Item: 9.7.2; Source: FUTUREWEI; Title: Enhancements for Network Energy Savings; Document for: Discussion and decision.

3GPP TSG-RAN WG1 Meeting #110; R1-2205861; Toulouse, France, Aug. 22-Aug. 26, 2022; Agenda item: 9.7.2; Source: Huawei, HiSilicon; Title: Discussion on network energy saving techniques; Document for: Discussion and Decision.

3GPP TSG RAN WG1 #110; R1-2206000; Toulouse, France, Aug. 22-26, 2022; Agenda Item: 9.7.2; Source: Spreadtrum Communications; Title: Discussion on network energy saving techniques; Document for: Discussion and decision.

3GPP TSG RAN WG1 #110-e; R1- 2206054; Toulouse, France, Aug. 22-26, 2022; Source: vivo; Title: Discussions on network energy saving techniques; Agenda Item: 9.7.2; Document for: Discussion and Decision.

3GPP TSG RAN WG1 Meeting#110; R1-2206075; Toulouse, France, Aug. 22-26, 2022; Agenda item: 9.7.2; Source: Nokia, Nokia Shanghai Bell; Title: Network Energy Saving Techniques; Document for: Discussion and Decision.

3GPP TSG-RAN WG1 #110; R1-2206142; Toulouse, France, Aug. 22-26, 2022; Agenda Item: 9.7.2; Source: Panasonic; Title: Discussion on potential network energy saving techniques; Document for: Discussion/Decision.

3GPP TSG RAN WG1 #110; R1- 2206173; Toulouse, France, Aug. 22-26, 2022; Agenda Item: 9.7.2; Source: Fujitsu; Title: Discussion on network energy saving techniques; Document for: Discussion/Decision.

3GPP TSG RAN WG1 #110; R1-2206309; Toulouse, France, Aug. 22-26, 2022; Source: OPPO; Title: Discussion on NW energy savings techniques; Agenda Item: 9.7.2; Document for: Discussion and Decision.

3GPP TSG RAN WG1 #110; R1-2206412; Toulouse, France, Aug. 22-26, 2022; Source: CATT; Title: Network Energy Saving techniques in time, frequency, and spatial domain; Agenda Item: 9.7.2; Document for: Discussion and Decision.

(56) References Cited

OTHER PUBLICATIONS

3GPP TSG RAN WG1 Meeting #110; R1-2206517; Toulouse, France, Aug. 22-26, 2022; Agenda item: 9.7.2; Source: Lenovo; Title: Network energy saving techniques; Document for: Discussion.

3GPP TSG RAN WG1 Meeting #110; R1-2206596; Toulouse, France, Aug. 22-26, 2022; Source: Intel Corporation; Title: Discussion on Network Energy Saving Techniques; Agenda item: 9.7.2; Document for: Discussion.

3GPP TSG RAN WG1 #110; R1-2206655; Toulouse, France, Aug. 22-26, 2022; Agenda item: 9.7.1; Source: Xiaomi; Title: Discussions on techniques for network energy Saving; Document for: Discussion.

3GPP TSG RAN WG1 #110; R1-2206666; Toulouse, France, Aug. 22-26, 2022; Agenda Item: 9.7.2; Source: InterDigital Inc.; Title: Potential techniques for network energy saving; Document for: Discussion and Decision.

* cited by examiner protocol layer header

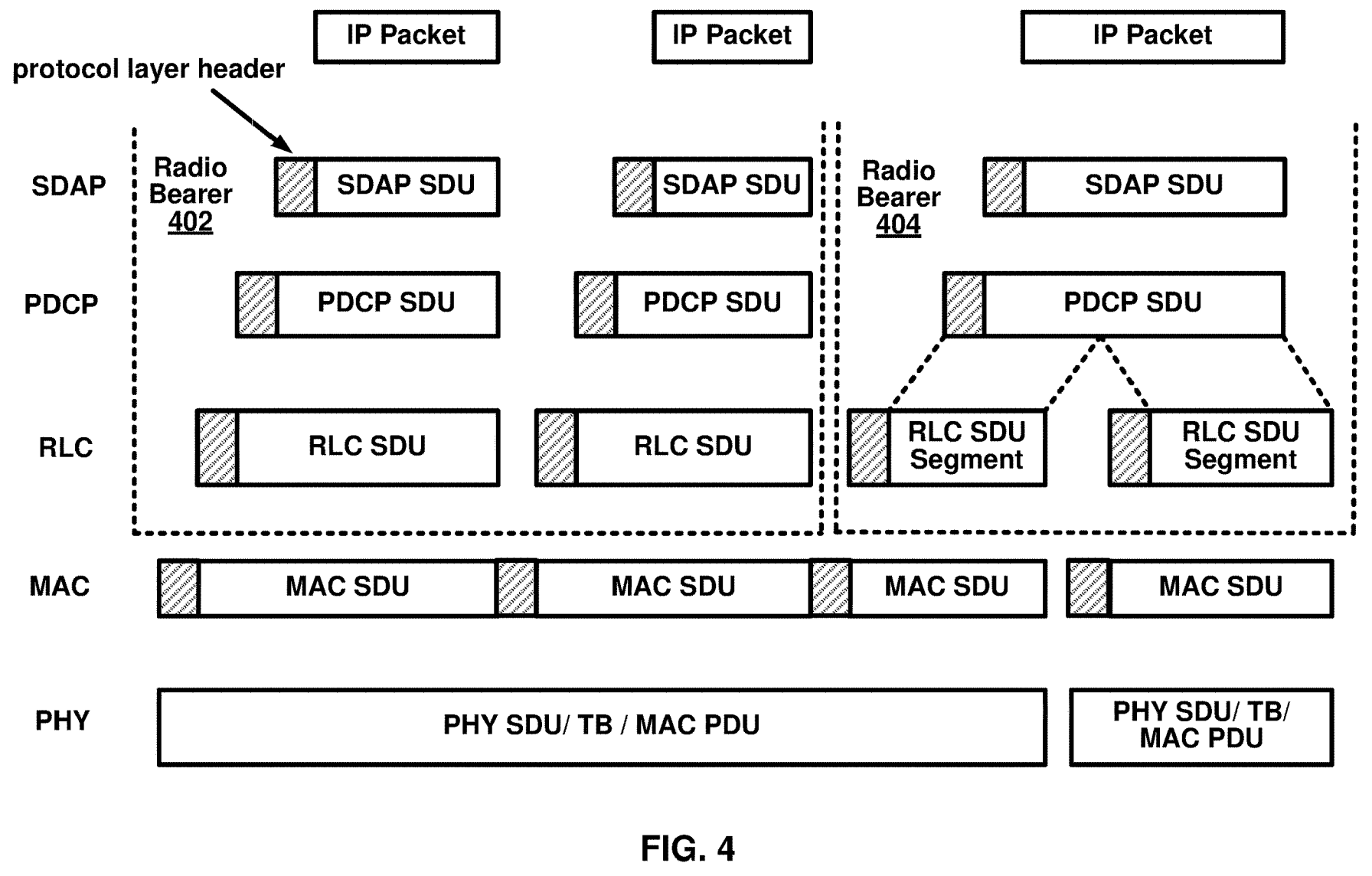

Radio Bearer 402

Radio Bearer 404

IP Packet

SDAP SDU

PDCP SDU

RLC SDU

RLC SDU Segment

MAC SDU

PHY SDU/ TB/ MAC PDU

PHY SDU / TB / MAC PDU

SDAP

PDCP

RLC

MAC

PHY

FIG. 4

▦ PBCH     ▨ PSS     ▧ SSS

P1

P2

P3

Transmit a wake up request/signal indicating a request to exit/
wakeup from an energy saving state

Receive a signal and/or channel indicating an exit/wake up from an energy saving state

METHOD, APPARATUS AND SYSTEM FOR NETWORK ENERGY SAVING

CROSS-REFERENCE TO RELATED APPLICATIONS

This application claims the benefit of U.S. Provisional Application No. 63/408,066, filed Sep. 19, 2022, which is hereby incorporated by reference in its entirety.

BRIEF DESCRIPTION OF THE DRAWINGS

FIG. 4 shows example flow of packets through the protocol layers in accordance with several of various embodiments of the present disclosure.

FIG. 18 shows an example flow diagram in accordance with several of the various embodiments of the present disclosure.

FIG. 19 shows an example flow diagram in accordance with several of the various embodiments of the present disclosure.

DETAILED DESCRIPTION

The exemplary embodiments of the disclosed technology enhance the processes in a wireless device and/or one or more base stations for network energy saving. The exemplary disclosed embodiments may be implemented in the technical field of wireless communication systems. More particularly, the embodiments of the disclosed technology enhance processes and signaling for entering or exiting/waking up from a network energy saving state and/or for indication or request for such entering and/or exiting.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figures 1A, 1B:
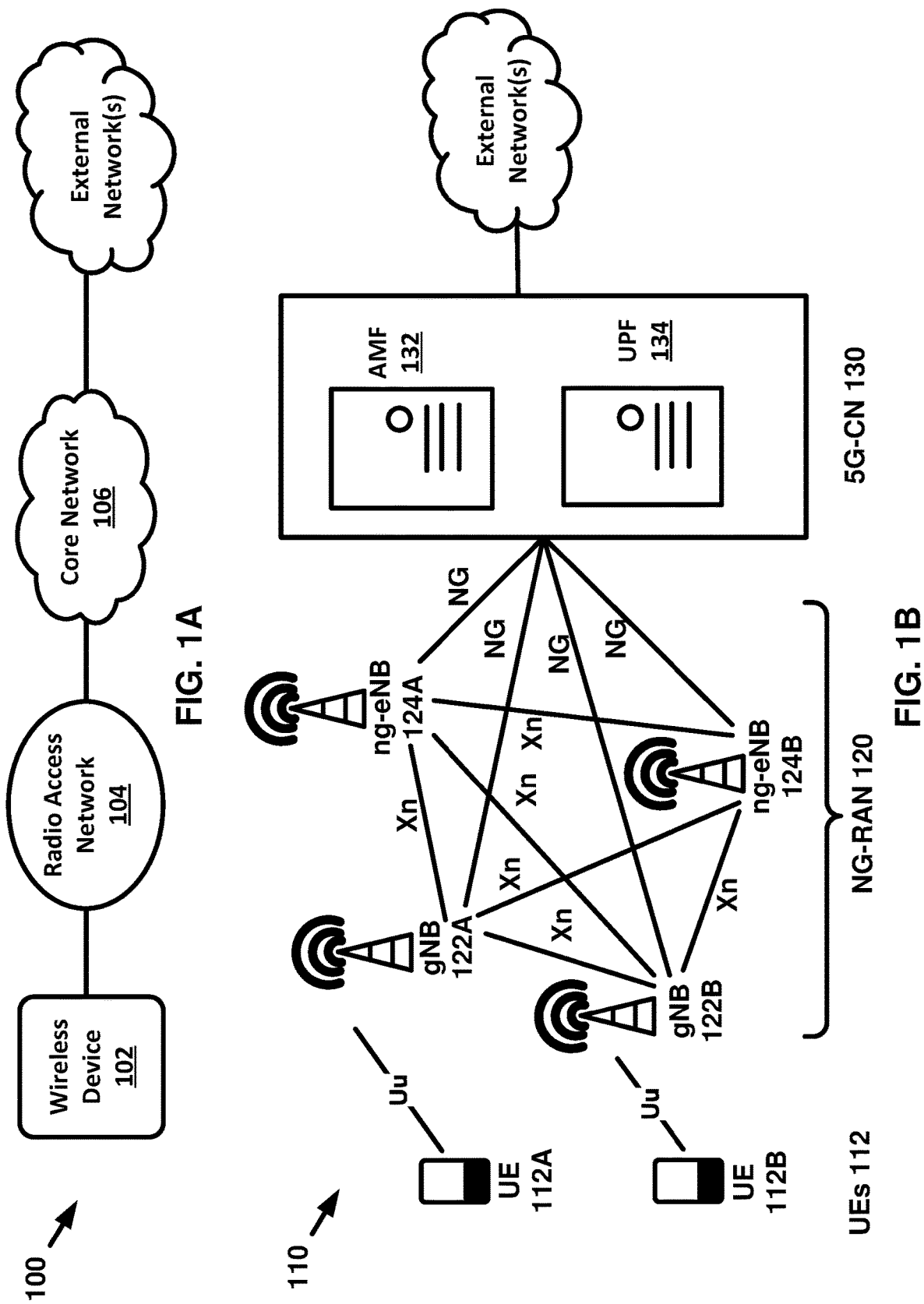
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNB s (e.g., ng-eNB 124A or ng-eNB 124B or collectively ng-eNB s 124). The general terminology for gNB s 122 and/or an ng-eNB s 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone operation, the 5G NR gNB is connected to a 5G-CN and the user plane and the control plane functionalities are provided by the 5G NR gNB.

Figure 2A:
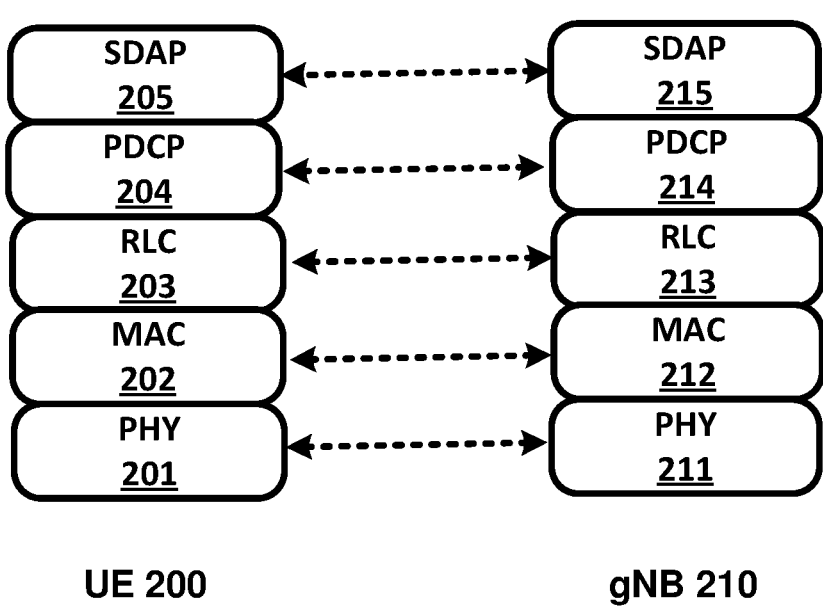
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
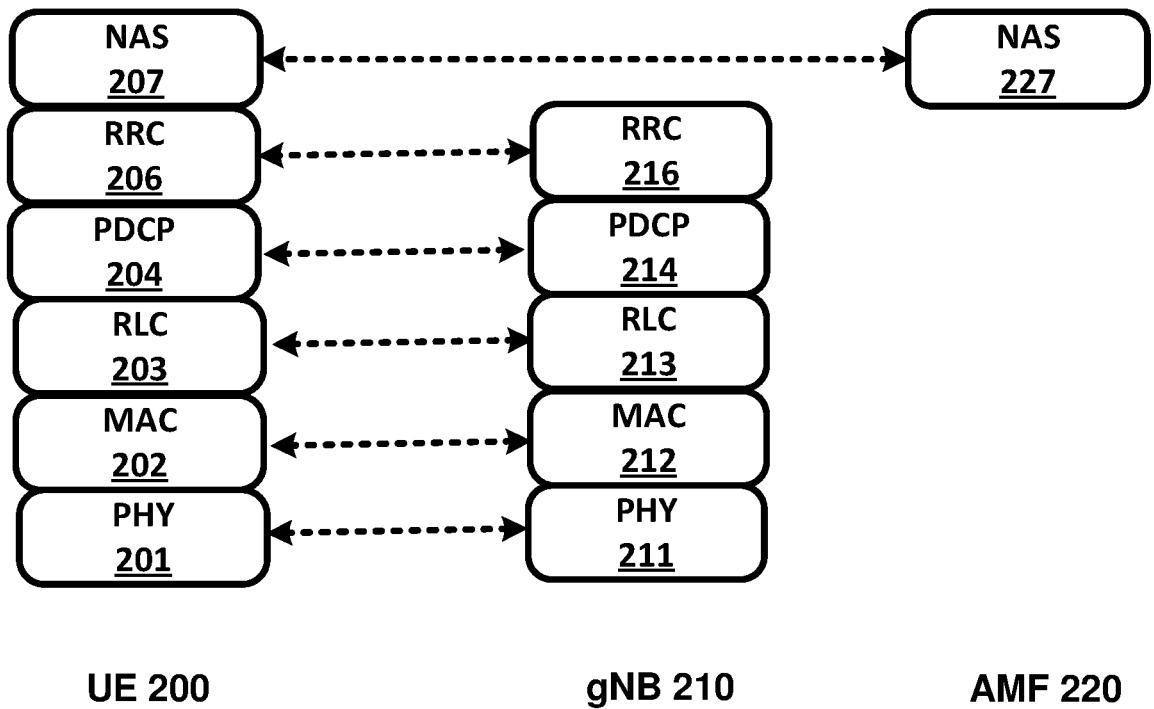

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
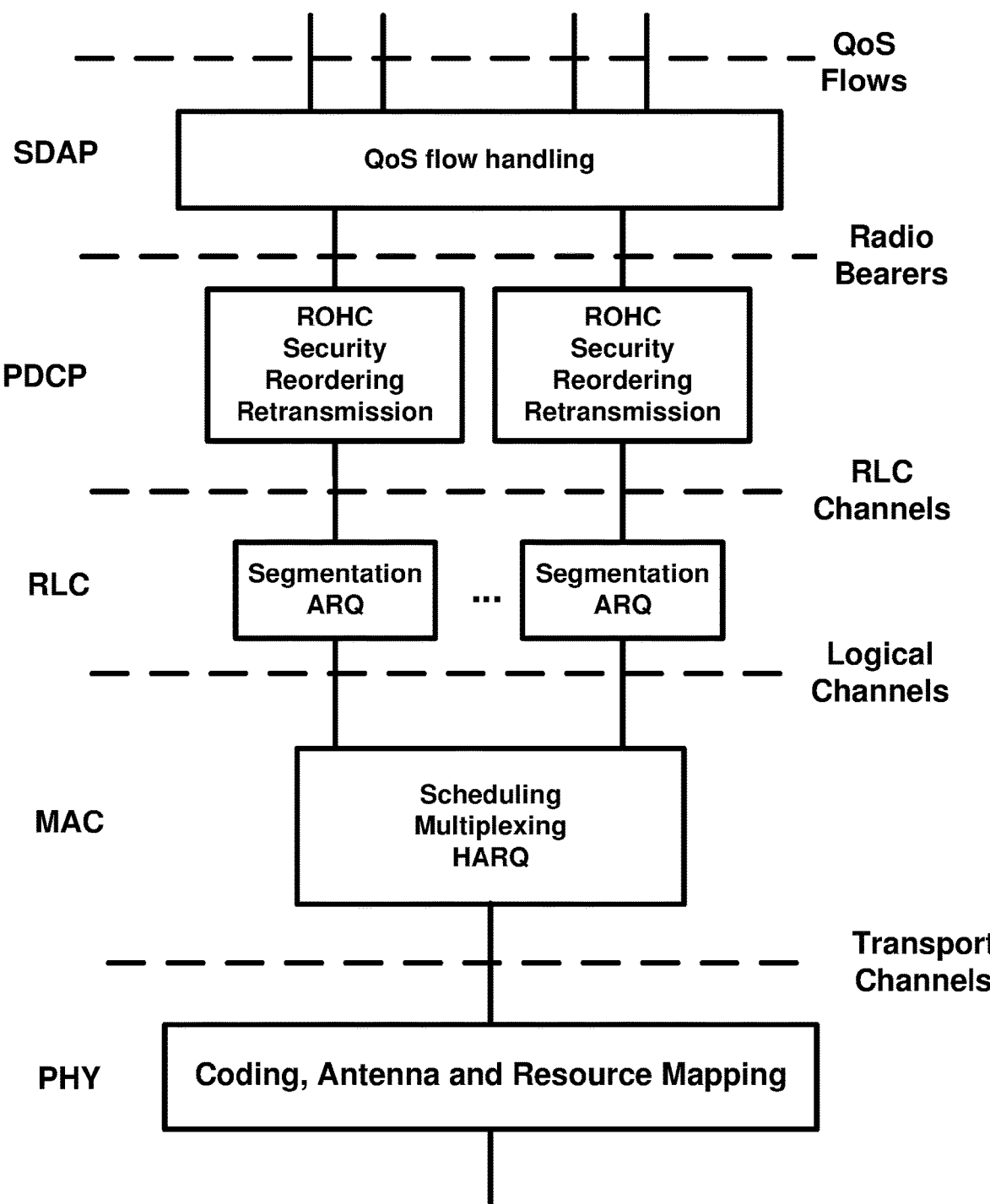
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TB s) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
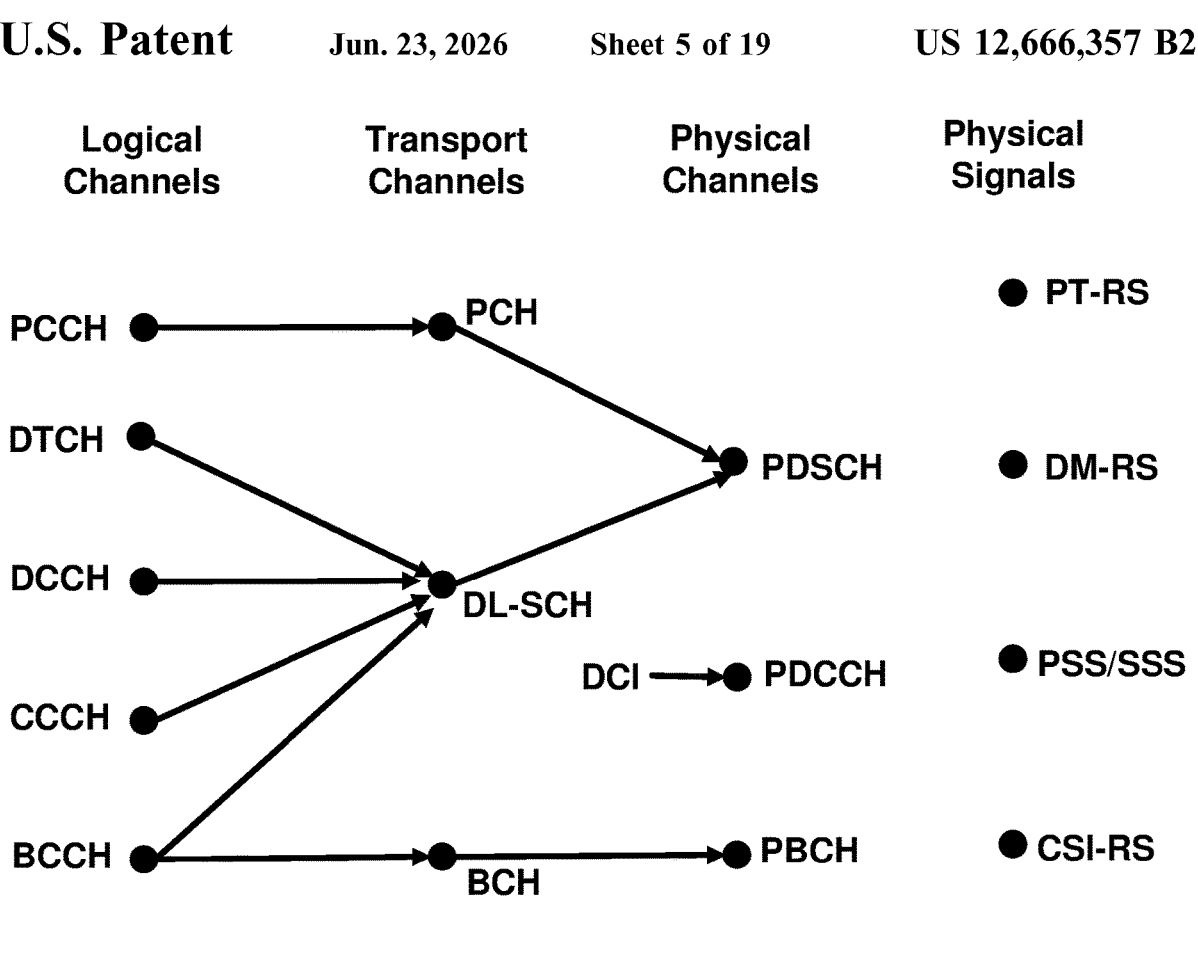
FIG. 5A shows example mapping of channels between layers of the protocol stack and different physical signals in downlink in accordance with several of various embodiments of the present disclosure.
Figure 5B:
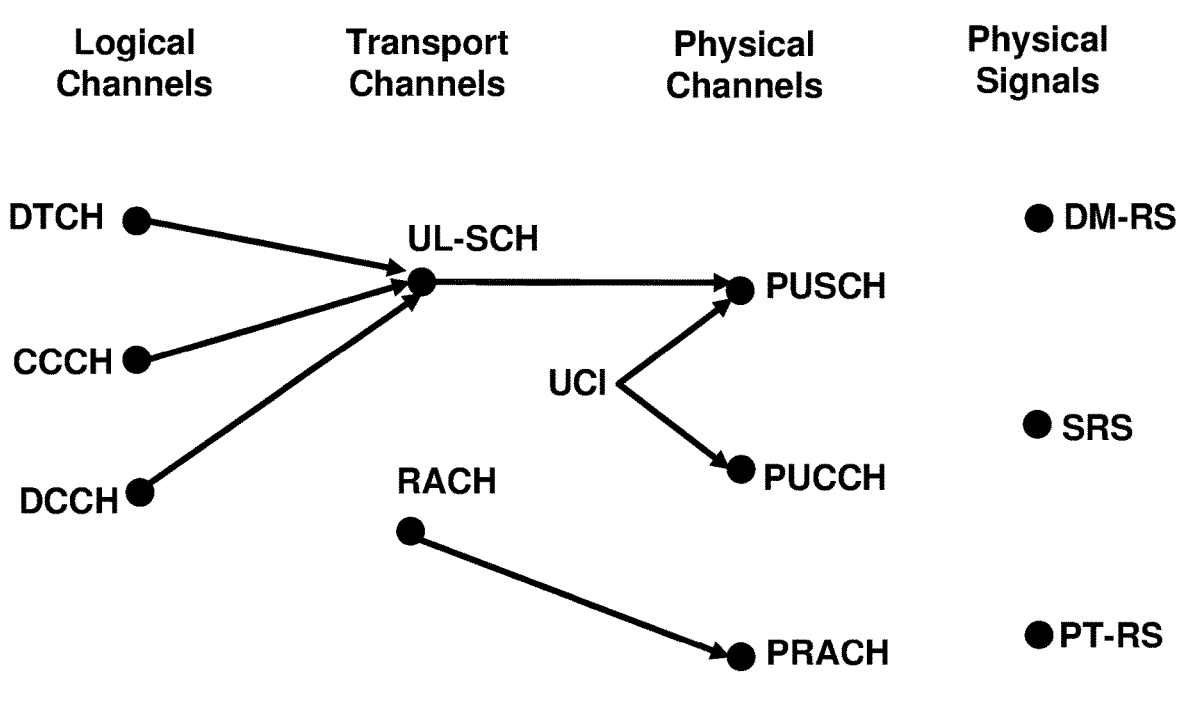
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
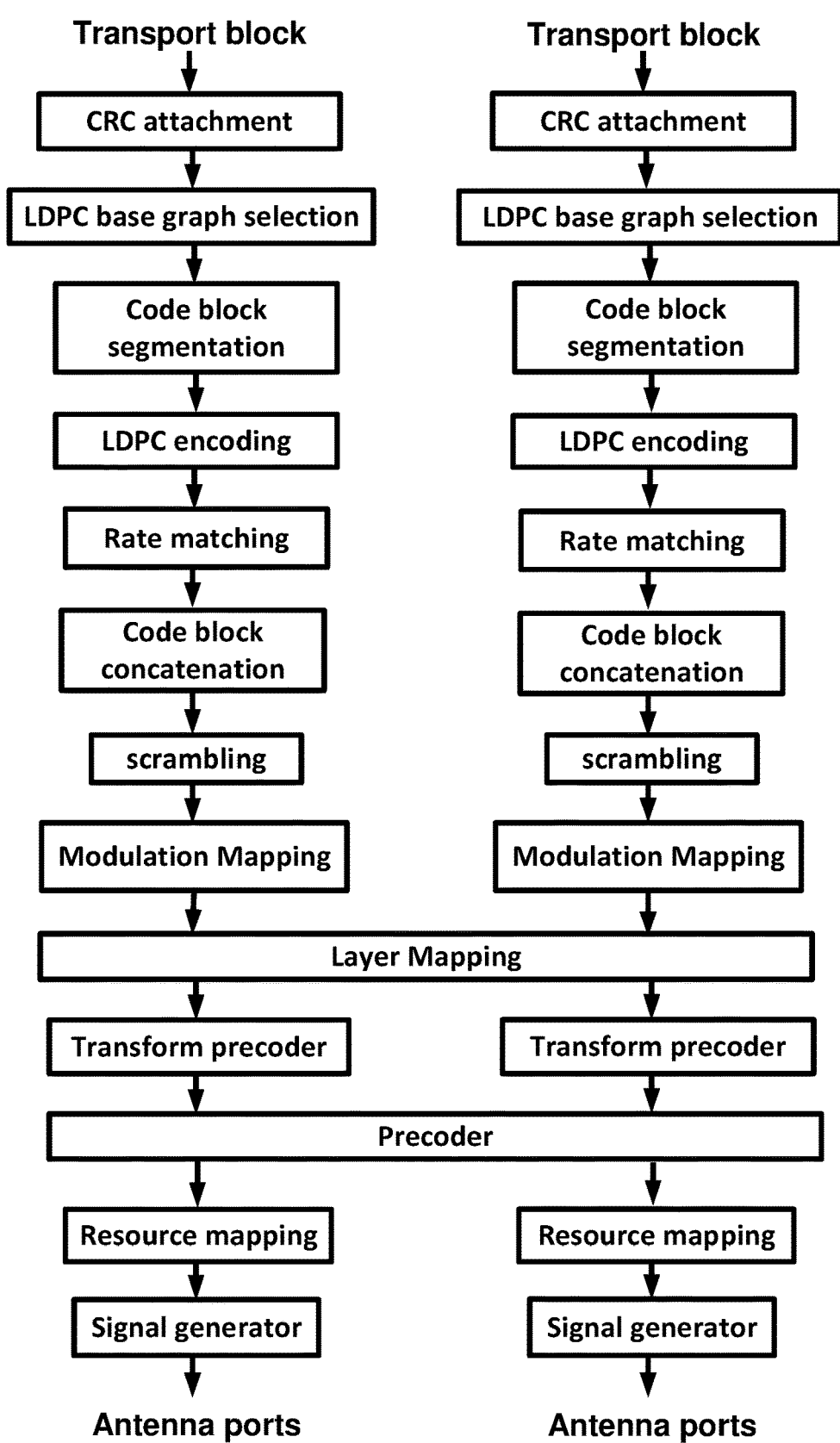
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
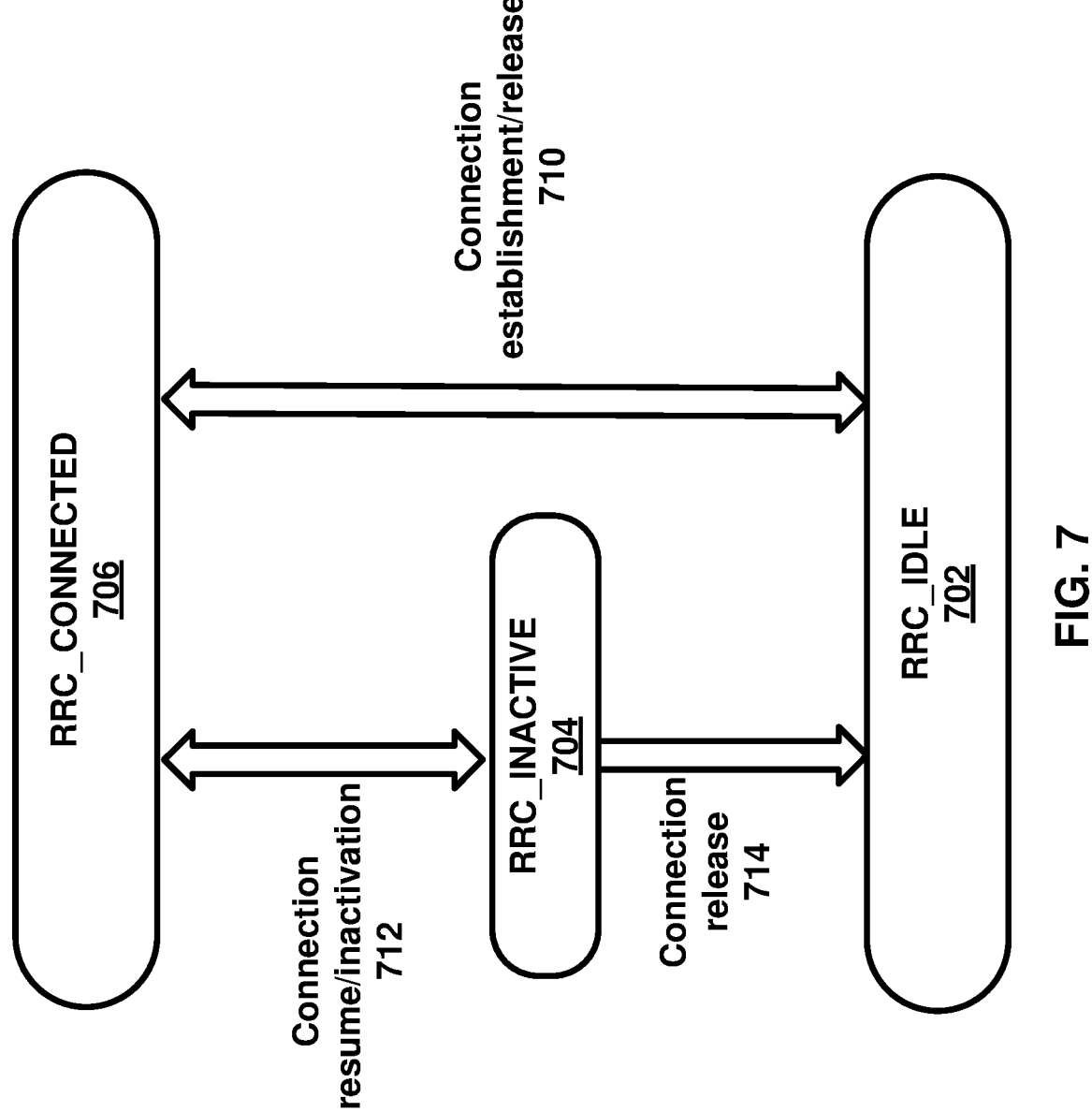
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC_INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), n/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 µs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu = 0$), 30 KHz ($\mu = 1$), 60 KHz ($\mu = 2$), 120 KHz ($\mu = 3$) and 240 KHz ($\mu = 4$). As discussed before, a duration of OFDM symbol is inversely proportional to the subcarrier spacing and therefor OFDM symbol duration may depend on the numerology (e.g., the µ value).

Figure 8:
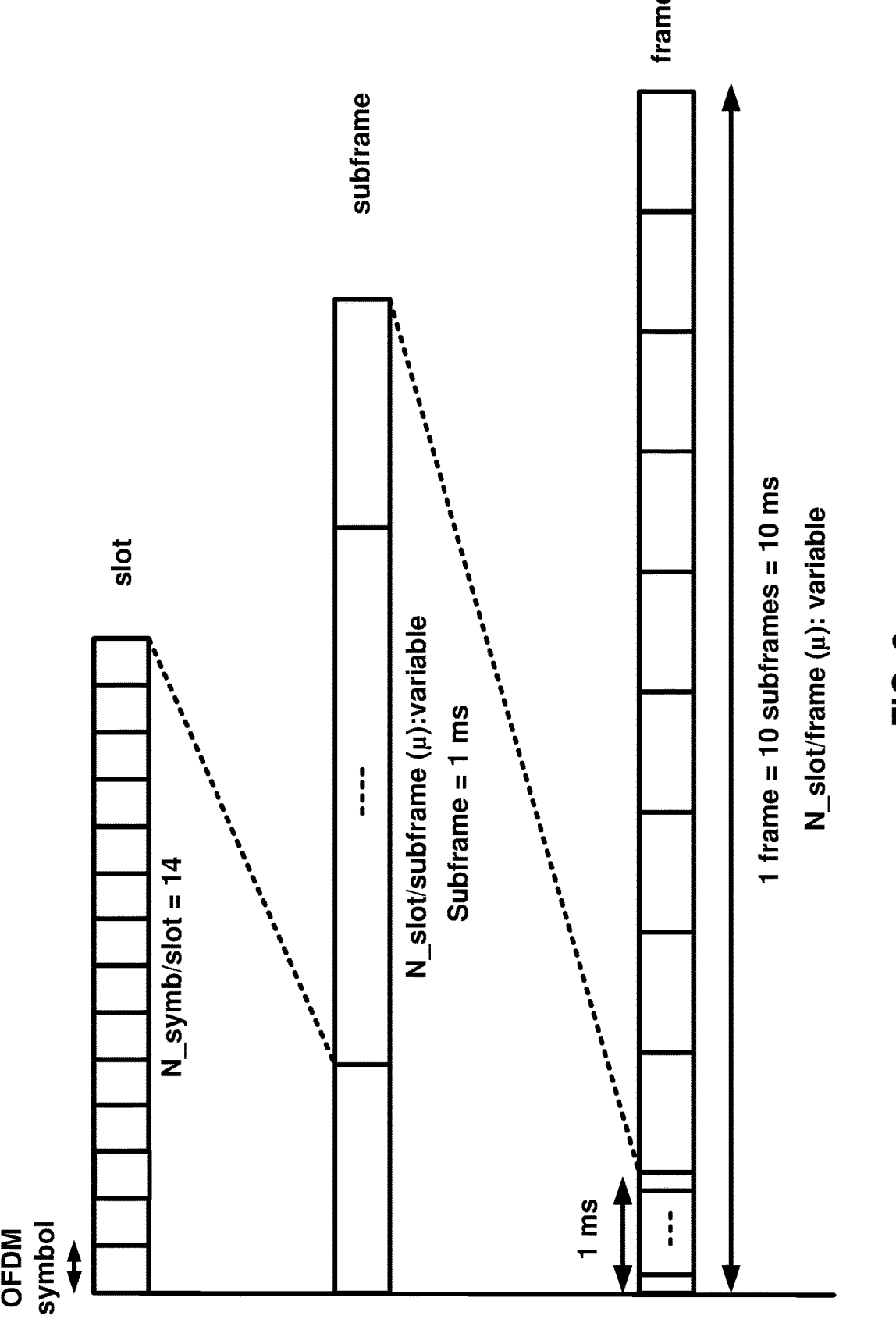
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $$N_{symb}^{slot}$$

OFDM symbols, wherein the $$N_{symb}^{slot}$$

may have a constant value (e.g., 14). Since different numerologies result in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of µ and may generally expressed as $$N_{slot}^{subframe,\mu}$$

and the number of symbols per subframe may be expressed as $$N_{symb}^{subframe,\mu} = N_{symb}^{slot} N_{slot}^{subframe,\mu}.$$

A frame may have a duration of 10 ms and may consist of 10 subframes. The number of slots per frame may depend on the numerology and therefore may be variable. The number of slots per frame may generally be expressed as $$N_{slot}^{frame,\mu}.$$

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
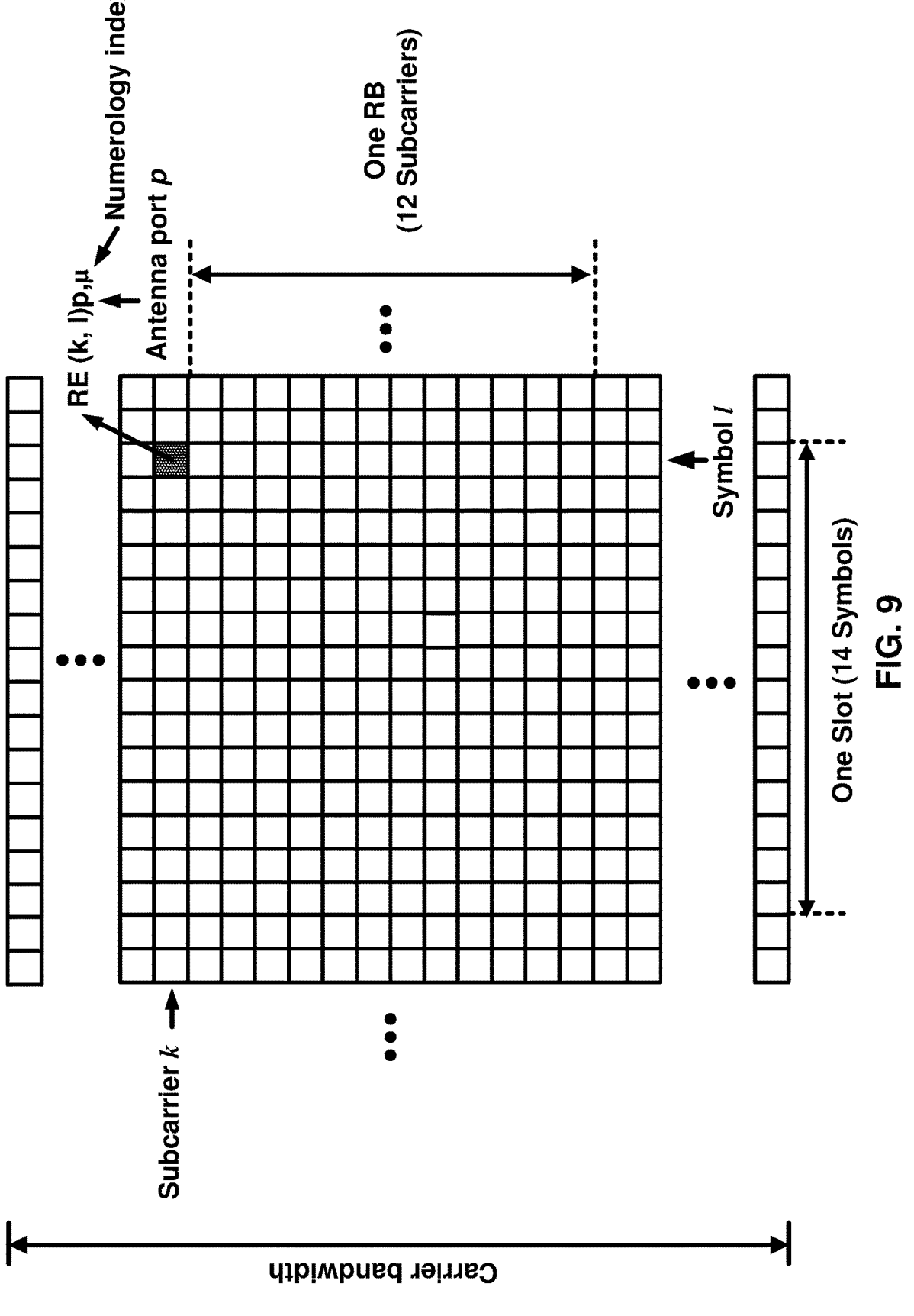
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration µ may be uniquely identified by $(k,l)_{p,\mu}$ where k is the index of a subcarrier in the frequency domain and l may refer to the symbol position in the time domain relative to some reference point. A resource block may be defined as $$N_{SC}^{RB} = 12$$

subcarriers. Since subcarrier spacing depends on the numerology of OFDM transmission, the frequency domain span of a resource block may be variable and may depend on the numerology. For example, for a subcarrier spacing of 15 KHz (e.g., µ=0), a resource block may be 180 KHz and for a subcarrier spacing of 30 KHz (e.g., µ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
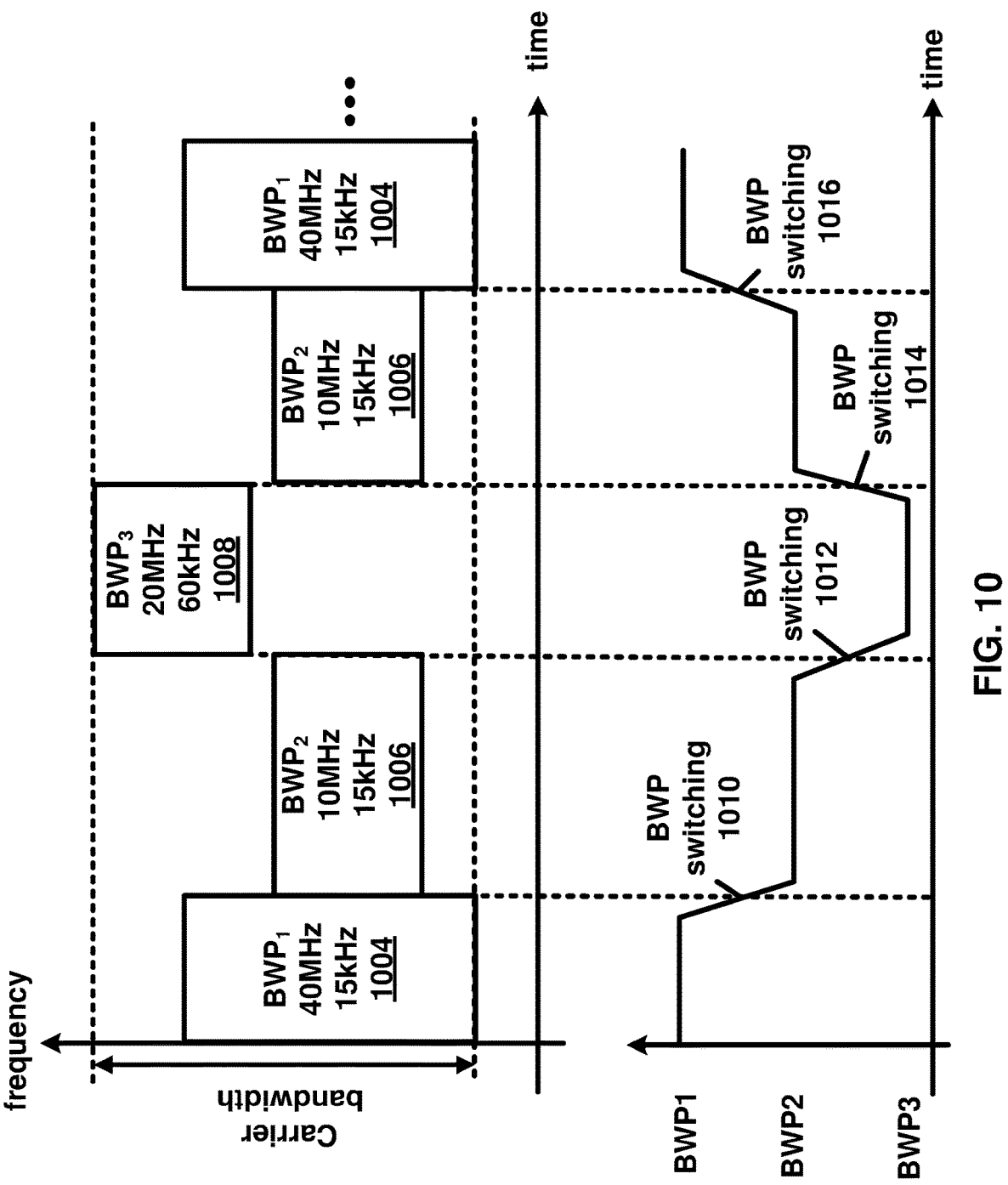
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figures 11A, 11B:
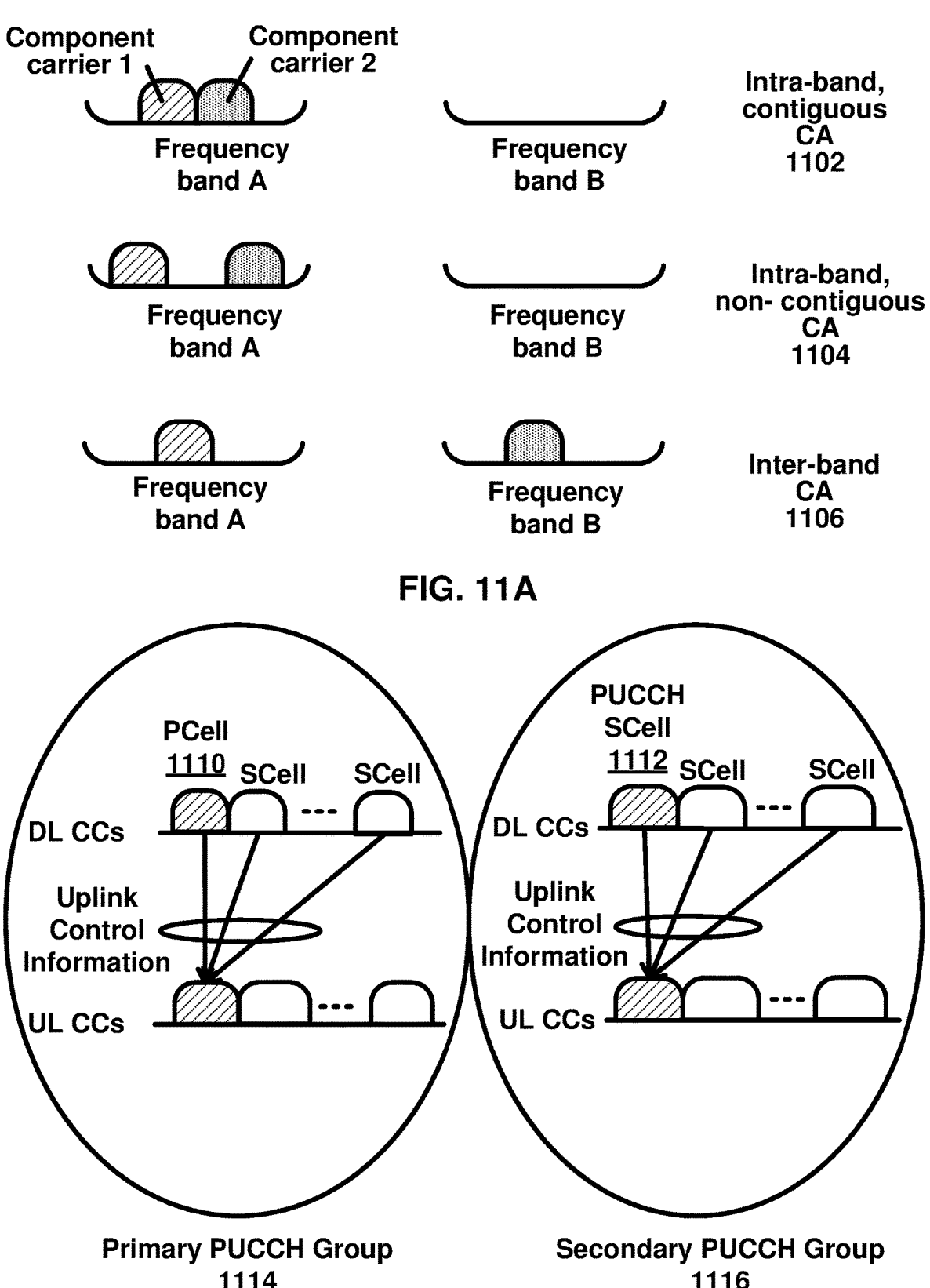
FIG. 11A shows example arrangements of carriers in carrier aggregation in accordance with several of various embodiments of the present disclosure.
FIG. 11B shows examples of uplink control channel groups in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
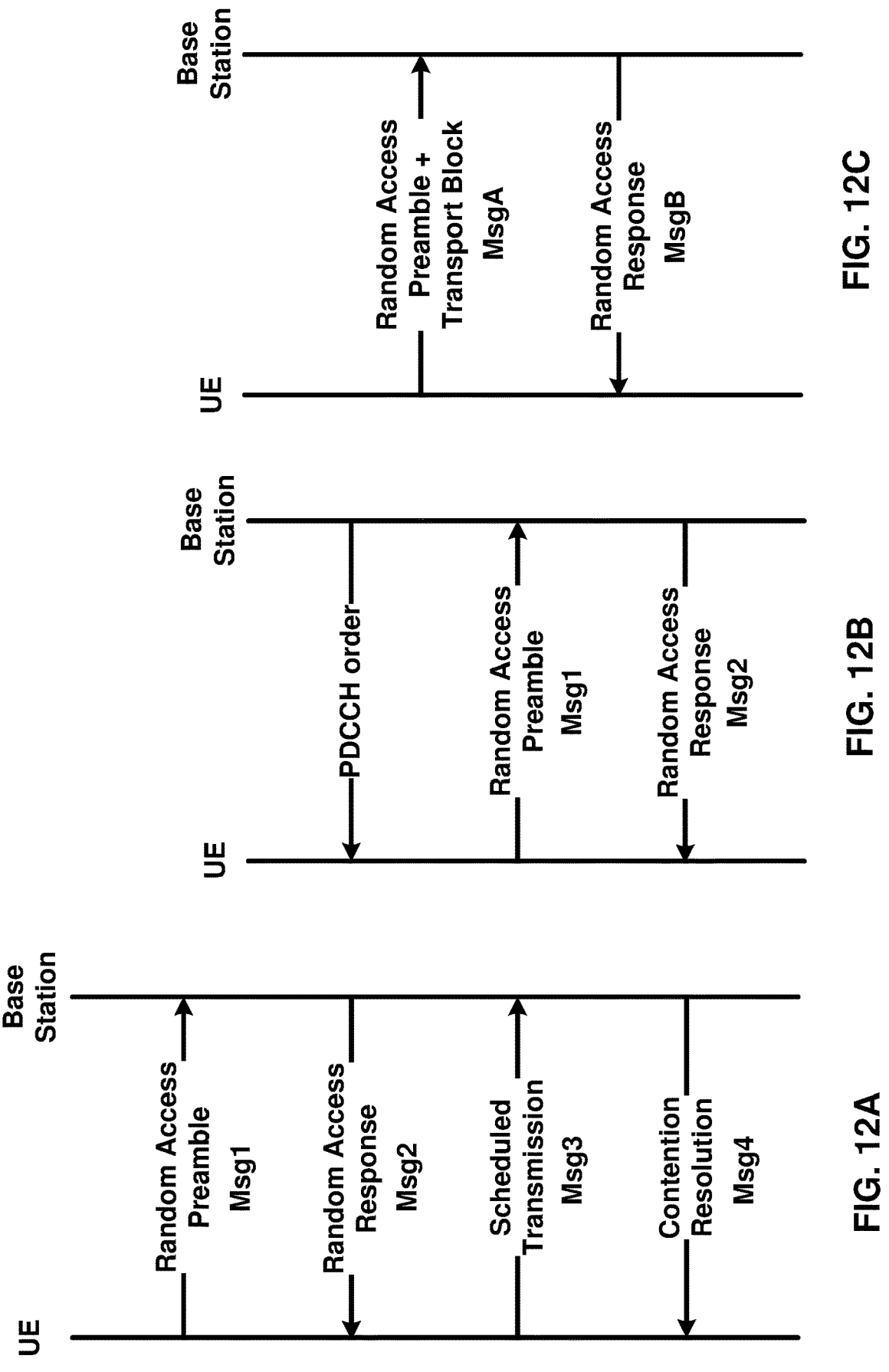
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg1 (random access preamble) and Msg2 (random access response) in FIG. 12B for CFRA may be analogous to Msg1 and Msg2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg2 (e.g., RAR) illustrated in FIGS. 12A and 12B may have similar and/or equivalent content.

The base station may periodically transmit synchronization signals (SS s), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
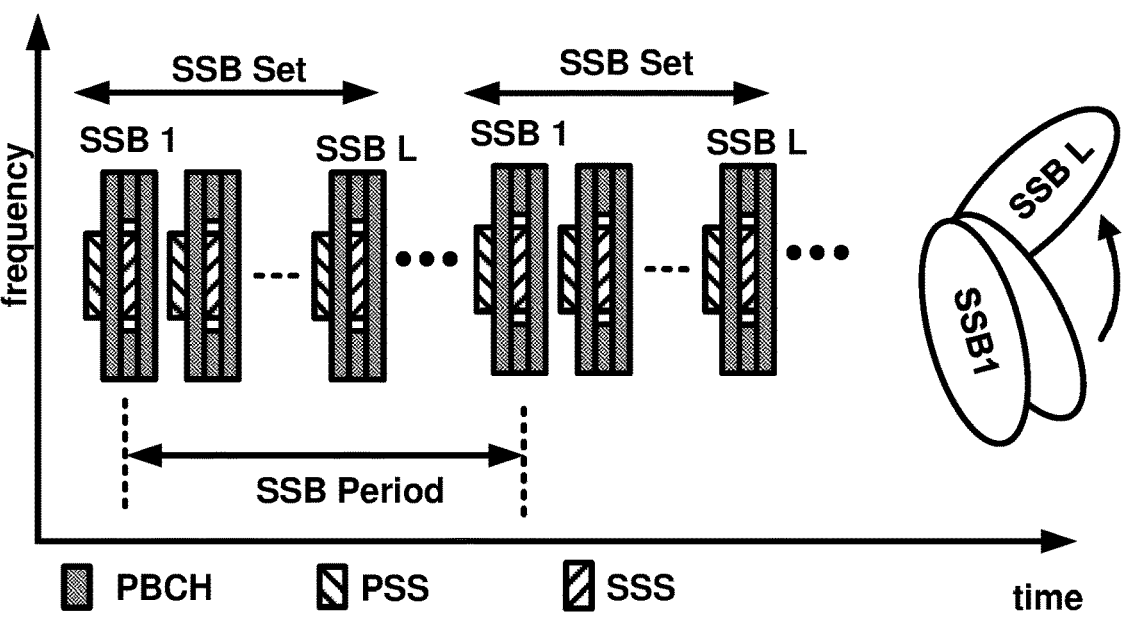
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RS s configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some cases, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RS s are transmitted. For semi-persistent CSI-RS, the CSI-RS resources for CSI-RS transmissions may be activated and deactivated by using a semi-persistent (SP) CSI-CSI Resource Set Activation/De-activation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RS s) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RS s) enables tracking and compensation of phase variations across the transmission duration. The phase variations may be, for example, due to oscillator phase noise. The oscillator phase noise may become more severe in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RS s of wireless devices scheduled on overlapping frequency domain resources.

Figure 13B:
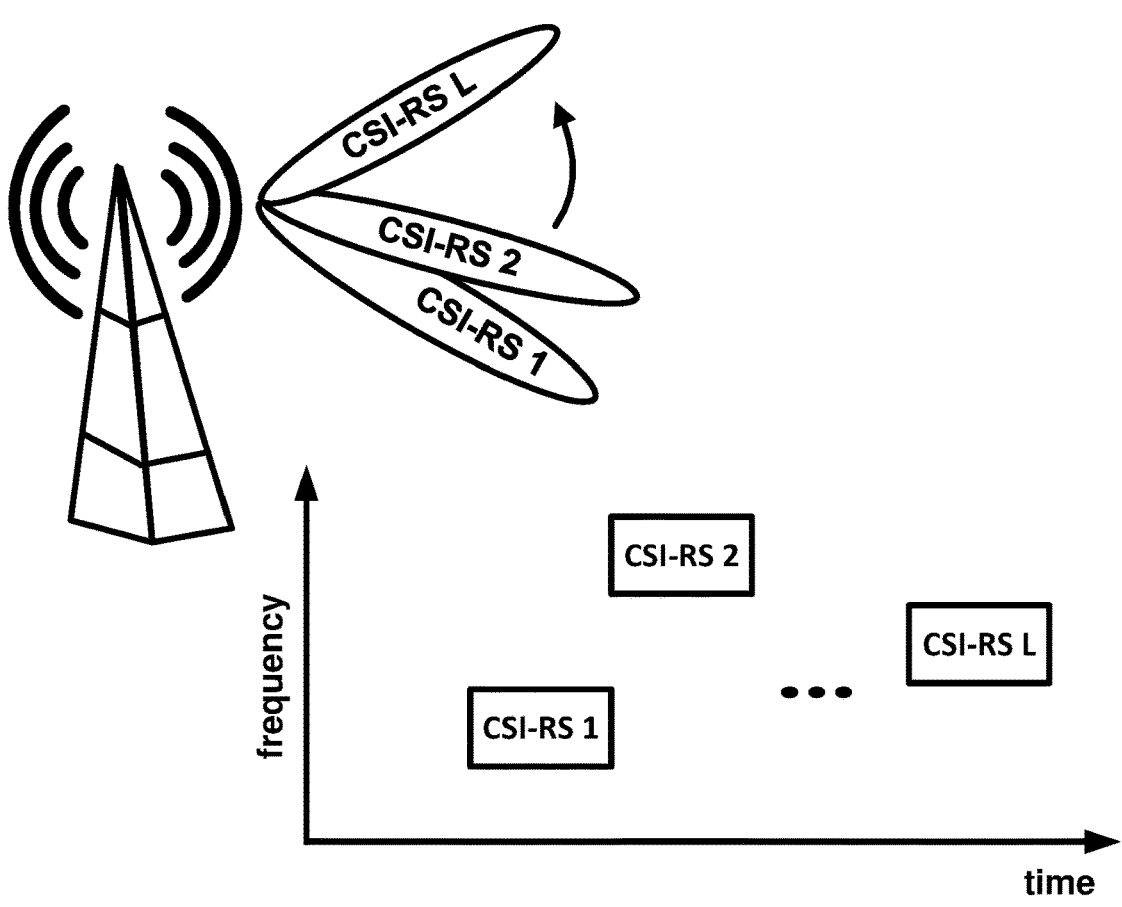
FIG. 13B shows example time and frequency structure of CSI-RSs and their association with beams in accordance with several of various embodiments of the present disclosure.

FIG. 13B shows example time and frequency structure of CSI-RS s and their association with beams in accordance with several of various embodiments of the present disclosure. A beam of the L beams shown in FIG. 13B may be associated with a corresponding CSI-RS resource. The base station may transmit the CSI-RS s using the configured CSI-RS resources and a UE may measure the CSI-RS s (e.g., received signal received power (RSRP) of the CSI-RS s) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figures 14A, 14B, 14C:
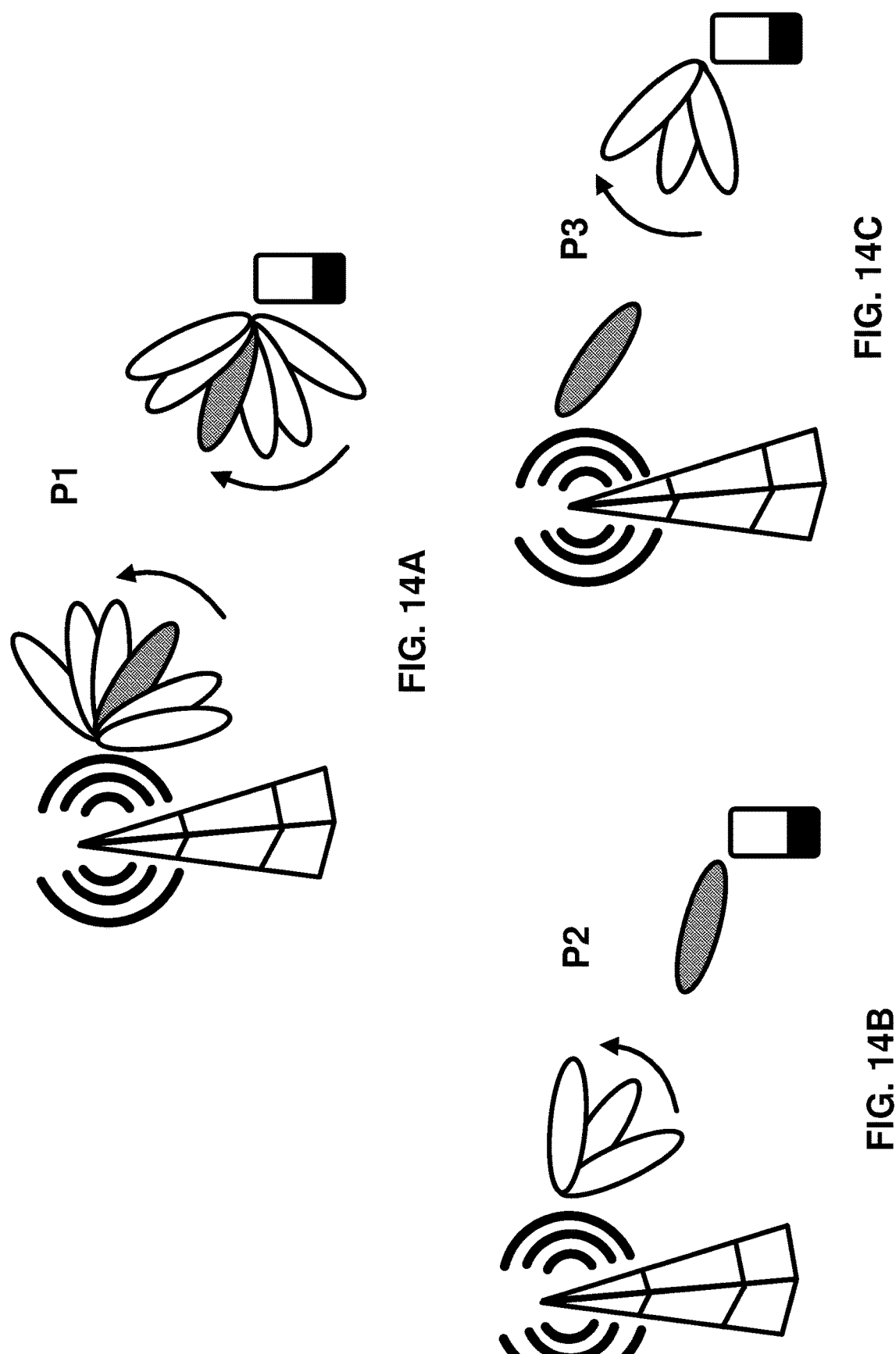
FIG. 14A, FIG. 14B and FIG. 14C show example beam management processes in accordance with several of various embodiments of the present disclosure.

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base stations (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
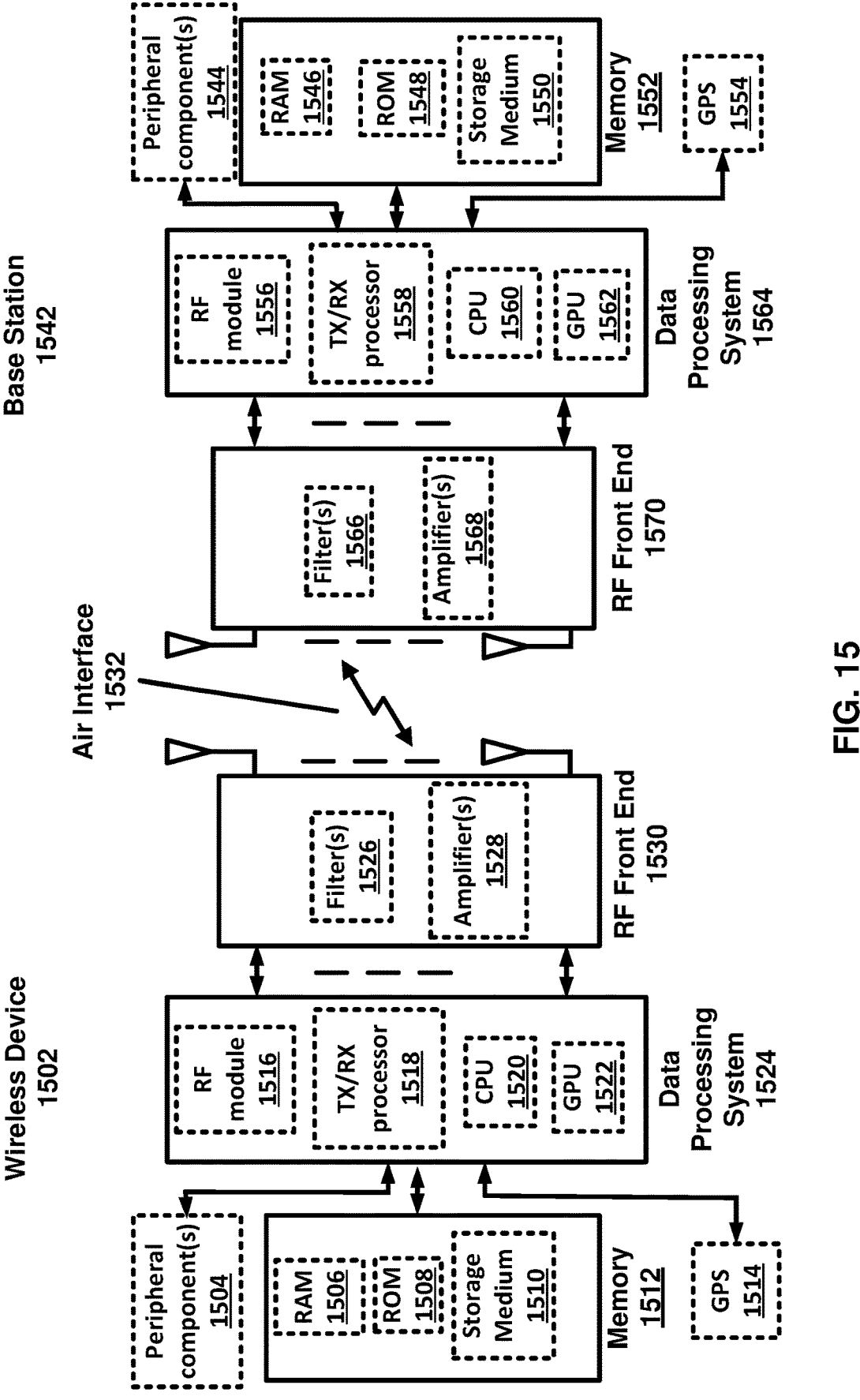
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more messages comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, paging may allow the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages may be addressed with P-RNTI on PDCCH. The paging messages may be sent on PCCH and the short messages may be sent over PDCCH directly.

In an example while in RRC_IDLE, the UE may monitor the paging channels for CN-initiated paging. While in RRC_INACTIVE with no ongoing SDT procedure the UE may monitor paging channels for RAN-initiated paging and CN-initiated paging. Paging DRX may be defined where the UE in RRC_IDLE or RRC_INACTIVE may monitor paging channels during one Paging Occasion (PO) per DRX cycle.

In an example, the Paging DRX cycles may be configured by the network. For CN-initiated paging, a default cycle is broadcast in system information; For CN-initiated paging, a UE specific cycle may be configured via NAS signaling; For RAN-initiated paging, a UE-specific cycle may be configured via RRC signaling. The UE may use the shortest of the DRX cycles applicable i.e., a UE in RRC_IDLE may use the shortest of the first two cycles above, while a UE in RRC_INACTIVE may use the shortest of the three.

In an example, the POs of a UE for CN-initiated and RAN-initiated paging may be based on the same UE ID, resulting in overlapping POs for both. The number of different POs in a DRX cycle may be configurable via system information and a network may distribute UEs to those POs based on their IDs.

In an example, Semi-Persistent Scheduling (SPS) may be configured by RRC for a Serving Cell per BWP. Multiple assignments may be active simultaneously in the same BWP. In an example, activation and deactivation of the DL SPS may be independent among the Serving Cells.

In an example, for the DL SPS, a DL assignment may be provided by PDCCH, and stored or cleared based on L1 signaling indicating SPS activation or deactivation.

In an example, RRC may configure the following parameters when the SPS is configured: cs-RNTI: CS-RNTI for activation, deactivation, and retransmission; nrofHARQ-Processes: the number of configured HARQ processes for SPS; harq-ProcID-Offset: Offset of HARQ process for SPS; periodicity: periodicity of configured downlink assignment for SPS.

In an example, when the SPS is released by upper layers, the corresponding configurations may be released.

In an example, after a downlink assignment is configured for SPS, the MAC entity may consider sequentially that the Nth downlink assignment occurs in the slot for which: (numberOfSlotsPerFrame×SFN+slot number in the frame) =[(numberOfSlotsPerFrame×SFNstart time+slotstart time)+ N×periodicity×numberOfSlotsPerFrame/10]     modulo (1024×numberOfSlotsPerFrame) where SFNstart time and slotstart time may be the SFN and slot, respectively, of the first transmission of PDSCH where the configured downlink assignment was (re-)initialized.

In an example, there may be two types of transmission without dynamic grant: configured grant Type 1 where an uplink grant may be provided by RRC and stored as configured uplink grant; and configured grant Type 2 where an uplink grant may be provided by PDCCH, and stored or cleared as configured uplink grant based on L1 signalling indicating configured uplink grant activation or deactivation. Type 1 and Type 2 are configured by RRC for a Serving Cell per BWP. Multiple configurations can be active simultaneously in the same BWP. For Type 2, activation and deactivation are independent among the Serving Cells. For the same BWP, the MAC entity can be configured with both Type 1 and Type 2.

In an example, a Buffer Status reporting (BSR) procedure may be used to provide the serving gNB with information about UL data volume in the MAC entity.

In an example, RRC may configure the following parameters to control the BSR: periodicB SR-Timer; retxB SR-Timer; logicalChannelSR-DelayTimerApplied; logical-ChannelSR-DelayTimer;     logicalChannelSR-Mask; logicalChannelGroup; sdt-LogicalChannelSR-DelayTimer.

In an example, a logical channel may be allocated to an LCG using the logic alChannelGroup.

In an example, the MAC entity may determine the amount of UL data available for a logical channel according to a data volume calculation procedure.

In an example, a BSR may be triggered if UL data, for a logical channel which belongs to an LCG, becomes available to the MAC entity; and either this UL data belongs to a logical channel with higher priority than the priority of any logical channel containing available UL data which belong to any LCG; or none of the logical channels which belong to an LCG contains any available UL data in which case the BSR is referred to as Regular BSR.

In an example, a BSR may be triggered if UL resources are allocated and number of padding bits is equal to or larger than the size of the Buffer Status Report MAC CE plus its subheader, in which case the BSR is referred to as Padding BSR.

In an example, a BSR may be triggered if retxB SR-Timer expires, and at least one of the logical channels which belong to an LCG contains UL data, in which case the BSR is referred to as Regular BSR.

In an example, a BSR may be triggered if periodicBSR-Timer expires, in which case the BSR is referred to as Periodic BSR.

In an example, the Scheduling Request (SR) may be used for requesting UL-SCH resources for new transmission.

In an example, the MAC entity may be configured with zero, one, or more SR configurations. An SR configuration may consist of a set of PUCCH resources for SR across different BWPs and cells. For a logical channel or for SCell beam failure recovery and for consistent LBT failure recovery, one PUCCH resource for SR may be configured per BWP. For a logical channel serving a radio bearer configured with SDT, PUCCH resource for SR may not be configured for SDT. For beam failure recovery of BFD-RS set(s) of Serving Cell, up to two PUCCH resources for SR may be configured per BWP.

In an example, an SR configuration may correspond to one or more logical channels and/or to SCell beam failure recovery and/or to consistent LBT failure recovery and/or to beam failure recovery of BFD-RS set(s). A logical channel, SCell beam failure recovery, beam failure recovery of BFD-RS set and consistent LBT failure recovery, may be mapped to zero or one SR configuration, which may be configured by RRC. The SR configuration of the logical channel that triggered a BSR or the SCell beam failure recovery, or the beam failure recovery of BFD-RS set or the consistent LBT failure recovery (if such a configuration exists) may be considered as corresponding SR configuration for the triggered SR.

In an example, RRC may configure the following parameters for the scheduling request procedure: sr-ProhibitTimer (per SR configuration); sr-TransMax (per SR configuration).

In an example, the following UE variable may be used for the scheduling request procedure: SR_COUNTER (per SR configuration).

In an example, if an SR is triggered and there are no other SRs pending corresponding to the same SR configuration, the MAC entity may set the SR_COUNTER of the corresponding SR configuration to 0.

In an example, when an SR is triggered, it may be considered as pending until it is cancelled.

In an example, pending SR(s) for BSR triggered according to the BSR procedure prior to the MAC PDU assembly may be cancelled and each respective sr-ProhibitTimer may be stopped when the MAC PDU is transmitted and this PDU includes a Long or Short BSR MAC CE which contains buffer status up to (and including) the last event that triggered a BSR prior to the MAC PDU assembly. The pending SR(s) for BSR triggered according to the BSR procedure may be cancelled and each respective sr-ProhibitTimer may be stopped when the UL grant(s) can accommodate all pending data available for transmission.

In an example, the IE LogicalChannelConfig may be used to configure the logical channel parameters.

In an example, a MAC entity may be configured by RRC per Serving Cell with a beam failure recovery procedure which may be used for indicating to the serving gNB of a new SSB or CSI-RS when beam failure is detected on the serving SSB(s)/CSI-RS(s). Beam failure may be detected by counting beam failure instance indication from the lower layers to the MAC entity. If beamFailureRecoveryConfig is reconfigured by upper layers during an ongoing Random Access procedure for beam failure recovery for SpCell, the MAC entity may stop the ongoing Random Access procedure and initiate a Random Access procedure using the new configuration.

In an example, the MAC entity may be configured by RRC with a consistent LBT failure recovery procedure. Consistent LBT failure may be detected per UL BWP by counting LBT failure indications, for UL transmissions, from the lower layers to the MAC entity.

In an example, RRC may configure the following parameters in the lbt-FailureRecoveryConfig: lbt-FailureInstanceMaxCount for the consistent LBT failure detection; lbt-FailureDetectionTimer for the consistent LBT failure detection.

In an example, the following UE variable may be used for the consistent LBT failure detection procedure: LBT_COUNTER (per Serving Cell): counter for LBT failure indication which is initially set to 0.

In an example, for an activated Serving Cell configured with lbt-FailureRecoveryConfig, if LBT failure indication has been received from lower layers: the MAC entity may start or restart the lbt-FailureDetectionTimer; and may increment LBT_COUNTER by 1. If LBT_COUNTER>=lbt-FailureInstanceMaxCount: the MAC entity may trigger consistent LBT failure for the active UL BWP in this Serving Cell. If this Serving Cell is the SpCell: if consistent LBT failure has been triggered in all UL BWPs configured with PRACH occasions on same carrier in this Serving Cell: the MAC entity may indicate consistent LBT failure to upper layers. Otherwise if the serving cell is not SpCell, the MAC entity may stop any ongoing Random Access procedure in this Serving Cell; may switch the active UL BWP to a UL BWP, on same carrier in this Serving Cell, configured with PRACH occasion and for which consistent LBT failure has not been triggered; and initiate a Random Access Procedure.

In an example, for an activated Serving Cell configured with lbt-FailureRecoveryConfig, if all triggered consistent LBT failures are cancelled in this Serving Cell; or if the lbt-FailureDetectionTimer expires; or if lbt-FailureDetectionTimer or lbt-FailureInstanceMaxCount is reconfigured by upper layers, the MAC entity may set LBT_COUNTER to 0.

In an example, the network may activate and deactivate the configured Semi-persistent CSI-RS/CSI-IM resource sets of a Serving Cell by sending the SP CSI-RS/CSI-IM Resource Set Activation/Deactivation MAC CE. The configured Semi-persistent CSI-RS/CSI-IM resource sets may initially be deactivated upon (re-)configuration by upper layers and after reconfiguration with sync.

In an example, if the MAC entity receives an SP CSI-RS/CSI-IM Resource Set Activation/Deactivation MAC CE on a Serving Cell, the MAC entity may indicate to lower layers the information regarding the SP CSI-RS/CSI-IM Resource Set Activation/Deactivation MAC CE.

In an example, a UE may perform aperiodic CSI reporting using PUSCH on serving cell c upon successful decoding of a DCI format 0_1 or DCI format 0_2 which triggers an aperiodic CSI trigger state.

In an example, an aperiodic CSI report carried on the PUSCH may support wideband, and sub-band frequency granularities. An aperiodic CSI report carried on the PUSCH may support Type I, Type II, Enhanced Type II and Further Enhanced Type II Port Selection CSI.

In an example, a UE may perform semi-persistent CSI reporting on the PUSCH upon successful decoding of a DCI format 0_1 or DCI format 0_2 which activates a semi-persistent CSI trigger state. DCI format 0_1 and DCI format 0_2 may contain a CSI request field which may indicate the semi-persistent CSI trigger state to activate or deactivate. Semi-persistent CSI reporting on the PUSCH may support Type I, Type II with wideband, and sub-band frequency granularities, Enhanced Type II and Further Enhanced Type II Port Selection CSI. The PUSCH resources and MCS may be allocated semi-persistently by an uplink DCI.

In an example, CSI reporting on PUSCH may be multiplexed with uplink data on PUSCH except that semi-persistent CSI reporting on PUSCH activated by a DCI format may not be expected to be multiplexed with uplink data on the PUSCH. CSI reporting on PUSCH may be performed without any multiplexing with uplink data from the UE.

In an example, a UE may be semi-statically configured by higher layers to perform periodic CSI Reporting on the PUCCH. A UE may be configured by higher layers for multiple periodic CSI Reports corresponding to multiple higher layer configured CSI Reporting Settings, where the associated CSI Resource Settings are higher layer configured.

In an example, a UE may perform semi-persistent CSI reporting on the PUCCH applied starting from the first slot that is after slot $$n + 3N_{slot}^{subframe,\mu}$$

when the UE would transmit a PUCCH with HARQ-ACK information in slot n corresponding to the PDSCH carrying the activation command where □ is the SCS configuration for the PUCCH. The activation command may contain one or more Reporting Settings where the associated CSI Resource Settings are configured.

In an example, a MAC PDU may be a bit string that is byte aligned (e.g., multiple of 8 bits) in length. In an example, bit strings may be represented by tables in which the most significant bit is the leftmost bit of the first line of the table, the least significant bit is the rightmost bit on the last line of the table, and more generally the bit string may be read from left to right and then in the reading order of the lines. The bit order of each parameter field within a MAC PDU may be represented with the first and most significant bit in the leftmost bit and the last and least significant bit in the rightmost bit.

In an example, a MAC SDU may be a bit string that is byte aligned (e.g., multiple of 8 bits) in length. A MAC SDU may be included into a MAC PDU from the first bit onward.

In an example, a MAC CE may be a bit string that is byte aligned (e.g., multiple of 8 bits) in length. A MAC subheader may be a bit string that is byte aligned (e.g., multiple of 8 bits) in length. Each MAC subheader may be placed immediately in front of the corresponding MAC SDU, MAC CE, or padding.

In an example, the network may activate and deactivate the configured Semi-persistent CSI-RS/CSI-IM resource sets of a Serving Cell by sending the SP CSI-RS/CSI-IM Resource Set Activation/Deactivation MAC CE. The configured Semi-persistent CSI-RS/CSI-IM resource sets may initially be deactivated upon (re-)configuration by upper layers and after reconfiguration with sync.

In an example, if the MAC entity receives an SP CSI-RS/CSI-IM Resource Set Activation/Deactivation MAC CE on a Serving Cell, the MAC entity may indicate to lower layers the information regarding the SP CSI-RS/CSI-IM Resource Set Activation/Deactivation MAC CE.

In an example, the network may activate and deactivate the configured TCI states for PDSCH of a Serving Cell or a set of Serving Cells configured in simultaneousTCI-UpdateList1 or simultaneousTCI-UpdateList2 by sending the TCI States Activation/Deactivation for UE-specific PDSCH MAC CE. The network may activate and deactivate the configured TCI states for a codepoint of the DCI Transmission configuration indication field for PDSCH of a Serving Cell by sending the Enhanced TCI States Activation/Deactivation for UE-specific PDSCH MAC CE. The configured TCI states for PDSCH may initially be deactivated upon (re-)configuration by upper layers and after reconfiguration with sync.

In an example, if the MAC entity receives a TCI States Activation/Deactivation for UE-specific PDSCH MAC CE on a Serving Cell, the MAC entity may indicate to lower layers the information regarding the TCI States Activation/Deactivation for UE-specific PDSCH MAC CE.

In an example, if the MAC entity receives an Enhanced TCI States Activation/Deactivation for UE-specific PDSCH MAC CE on a Serving Cell, the MAC entity may indicate to lower layers the information regarding the Enhanced TCI States Activation/Deactivation for UE-specific PDSCH MAC CE.

In an example, the network may indicate a TCI state for PDCCH reception for a CORESET of a Serving Cell or a set of Serving Cells configured in simultaneousTCI-UpdateList1 or simultaneousTCI-UpdateList2 by sending the TCI State Indication for UE-specific PDCCH MAC CE. The network may indicate two TCI states for PDCCH reception for a CORESET of a Serving Cell or a set of Serving Cells configured in simultaneousTCI-UpdateList1 or simultaneousTCI-UpdateList2 by sending the Enhanced TCI States Indication for UE-specific PDCCH MAC CE.

In an example, if the MAC entity receives a TCI State Indication for UE-specific PDCCH MAC CE on a Serving Cell, the MAC entity may indicate to lower layers the information regarding the TCI State Indication for UE-specific PDCCH MAC CE.

In an example, if the MAC entity receives an Enhanced TCI States Indication for UE-specific PDCCH MAC CE on a Serving Cell, the MAC entity may indicate to lower layers the information regarding the Enhanced TCI States Indication for UE-specific PDCCH MAC CE.

In an example, the network may activate and deactivate the configured Semi-persistent ZP CSI-RS resource set of a Serving Cell by sending the SP ZP CSI-RS Resource Set Activation/Deactivation MAC CE. The configured Semi-persistent ZP CSI-RS resource sets may initially be deactivated upon (re-)configuration by upper layers and after reconfiguration with sync.

In an example, if the MAC entity receives an SP ZP CSI-RS Resource Set Activation/Deactivation MAC CE on a Serving Cell, the MAC entity may indicate to lower layers the information regarding the SP ZP CSI-RS Resource Set Activation/Deactivation MAC CE.

In example embodiments, processes in the base station and/or wireless device may be used to improve network energy savings in terms of base station transmission and/or reception.

In example embodiments, dynamic and/or semi-static and finer granularity adaptation of transmissions and/or receptions in one or more of network energy saving processes in time, frequency, spatial, and power domains may be used.

In example embodiments, wireless device feedback and/or UE assistance information may be used in network energy saving processes.

In example embodiments information exchange/coordination over network interfaces may be used in the network energy saving processes.

An example network energy saving process may enable time domain energy saving by the gNB. In an example, transmission/reception of common channels/signals, e.g., SSB, SIB1, other system information (SI), paging, PRACH, etc. may be reduced and/or adapted.

In an example embodiment, reducing or adaptation of transmission/reception of the common channels/signals may impact one or more processes such as cell (re)selection and/or handover and/or synchronization and measurements performed by the idle/inactive/connected UE.

In example embodiments, reducing transmission/reception of common channels/signals may be based on one or more of: no transmission/reception or reduced transmission/reception, increased periodicity, enablement of on-demand transmission/reception of common channels/signals, or off-loading of common channels/signals to other carriers or use of light or relaxed versions of common channels/signals.

In example embodiments, transmission/reception of periodic and semi-persistent signals and channels configuration such as one or more of CSI-RS, group-common/UE-specific PDCCH, SPS PDSCH, PUCCH carrying SR, PUCCH/PUSCH carrying CSI reports, PUCCH carrying HARQ-ACK for SPS, CG-PUSCH, SRS, positioning RS (PRS), etc. may be reduced/adapted.

In example embodiments, semi-static and/or dynamic cell on/off in one or more granularity, e.g., /subframe/slot/symbol may be used.

In an example, cell/network node activation may be requested by the UE, for example using signal/channel from UE for gNB's wake-up request.

In an example, L1/L2 based mobility may be enhanced to efficiently enable a network node (e.g., TRP, repeater) on/off operation within a cell.

In an example, enhanced signaling may be used for indication of semi-static and/or dynamic cell/subframe/slot/symbol on/off duration.

In an example, periodic and/or on-demand reference signal(s) from the gNB may be used to aid discovery of a cell.

In an example, UE C-DRX configurations in a UE-group or cell-specific manner may be dynamically adapted.

In an example, energy saving states or sleep modes may be utilized and the transition between states from leveraging cell on/off opportunities may be enabled. For example, gNB may wake up (e.g., in response to a wake up signal) due to user traffic, or user density.

Example embodiments may enhance cell discovery and measurement for discovery and measurement of cells in sleep or dormant states.

In an example, UE assistance information may be used for facilitating BS time domain adaptation.

Example time domain techniques for network energy saving may be applicable for single component carrier and multi-component carrier cases. In an example, UE grouping may be used for network energy saving processes.

An example network energy saving process may enable frequency resource usage adaptation by the gNB.

In an example, for operations with single-carrier or within a single component carrier (CC), dynamic bandwidth adaptation may be enhanced. For example, adjustments to resource blocks (RBs) and/or bandwidth part (BWP) used by UEs for transmission and reception, reducing BWP switch delay, UE-group BWP switching, and joint adaptation of transmission bandwidth and power spectral density may be used. In an example, UE group-common BWP or cell-specific BWP or dedicated BWP for network energy savings, and related BWP switching mechanism may be used.

In an example, for operation with multi-carrier, reducing/adapting common channels/signals for some component carrier (CC) in multi-carrier operations may be enabled. For example, SSB-less secondary cell operation for some CC in case of inter-band carrier aggregation may be enabled. For example, gNB's transmission/reception of other common channels/signals (than SSB) and TRS for some CC in multi-carrier operations may be reduced/adapted. For example, UE group common dynamic Pcell switching may be used.

An example network energy saving process may be based on the adaptation of number of spatial elements of the gNB. Example spatial elements may include antenna element(s), TxRU(s) (with sub-array/full-connection), antenna panel(s), TRxP(s) (co-located or geographically separated from each other), logical antenna port(s) (corresponding to specific signals and channels).

In an example, feedback/assistance information from the UE may be used for dynamic spatial element adaptation. For example, the feedback assistance information may comprise/be based on CSI measurement and reports, SR, etc.

In an example, one or more of group common L1 signaling, broadcast signaling, MAC CE, etc. may be used for dynamic spatial element adaptation.

In an example, dynamic TRxP adaptation may be used based on triggering on/off conditions.

In an example, dynamic logical port adaptation and efficient port reconfigurations may be used.

In an example, joint adaptation of spatial-domain, frequency-domain and/or power-domain configurations may be used to avoid coverage loss. In an example, UEs may be grouped to reduce transmission and reception footprint at the gNB; including but not limited to the following.

In an example, adaptation of transmission power/processing and/or reception processing of signals/channels by the gNB may be used.

In an example, for dynamic adjustment of transmission power, dynamic DL power control for specific channel/reference signal, such as CSI-RS, adjustment of maximum PSD assigned to PRBs of PDSCH, etc. may be used. In an example, geographical area/user density may be used to adjust the transmission power. In an example, gNB transceiver algorithms and processes may be used to improve power efficiency.

In example embodiments, assistance information from the UE may be used to aid the gNB to perform energy saving techniques. Example assistance information may be one or more of: preferred SSB configurations, indication of semi-static UL channel transmissions, indication of UE's buffer status for UL channel transmissions, UE traffic information such as service priority, delay tolerance, data rate, data volume, traffic type, time criticality, and packet size(s), coverage, mobility status, location, conditions for triggering the assistance information from the UE.

In example embodiments, one or more of time-domain techniques, frequency domain techniques, spatial-domain techniques and power-domain techniques may be used by a wireless device and/or network for power saving/network energy saving (NES).

An example time domain technique for network energy saving may be based on adaptation of common signals and/or channels. For example, the periodicity and/or transmission pattern of one or more downlink common and/or broadcast signals, such as SSB/SI/paging/cell common PDCCH and/or random access occasions/resources may be dynamically varied.

In an example, light version of downlink common and/or broadcast signals may be used. In an example, one or more common signals/channels may be skipped in some of the scheduled occasions of the one or more common signals/channels (e.g., based on their associated/configured periodicity of the one or more common signals/channels).

In an example, transmission and/or reception of common signals and/or channels may be based on more than one periodicity. In an example, a burst pattern associated with the common signals and/or channels, e.g., a periodicity associated with the common signals and/or channels, may be adapted. In an example, SSB/SIB transmission or on-demand SSBs/SIB1 transmissions or SSB/SIB1-less operations may be dynamically adapted. In an example, signals/channels may be used to aid discovery of cells in lieu of SSBs. In an example, a mechanism may be supported for UE to trigger on-demand SSB/SIB1 transmission for fast access/fast cell activation.

An example time domain technique for network energy saving may be based on dynamic adaptation of UE specific signals and channels. In an example, network energy saving opportunities may be restricted by UE specific signals and channels that are semi-statically configured such as periodic or semi-persistent CSI-RS, group-common/UE-specific PDCCH, SPS PDSCH, PUCCH carrying SR, PUCCH/PUSCH carrying CSI reports, PUCCH carrying HARQ-ACK for SPS, CG-PUSCH, SRS, positioning RS (PRS).

In an example, the number of time occasions for one or more of the following resources during periods of network energy saving/power saving/dormancy may be reduced: CSI-RS, group-common/UE-specific PDCCH, SPS PDSCH, PUCCH carrying SR, PUCCH/PUSCH carrying CSI reports, PUCCH carrying HARQ-ACK for SPS, CG-PUSCH, SRS, positioning RS (PRS). In an example, UE may report UE assistance information, e.g., UE buffer status to help gNB make decisions about entering or exiting a network energy saving/power saving/dormant state.

In an example, configuration signaling may indicate reduced transmission/reception of UE specific signals and channels.

In an example, wake up signal (WUS)/wakeup request may be transmitted by a UE to gNB. The gNB (e.g., one or more cells provided by the gNB) may wake up from a dormant/power state/energy saving state (e.g., SSB-less/SIB1-less/SSB relaxed state) based on the wakeup request/wakeup signal (WUS). In an example, the wakeup signal (WUS) may be transmitted by the UE or a neighboring gNB (e.g., via Xn signaling).

In an example, a UE may detect a dormant power state/energy saving state (e.g., of a cell) before WUS transmission. In an example, resources may be reserved/configured for transmission of WUS. In an example, assistance information may be transmitted from the UEs to aid wake up operations by the gNB s.

An example time domain technique for network energy saving may be based on discontinuous transmission (DTX) and/or discontinuous reception (DRX).

In an example, DTX/DRX cycle configuration/pattern at the BS, may be aligned with the DRX cycle configured for UEs in connected mode or idle mode.

In an example, an alternative BS DTX with UE C-DRX alignment may be the use of DTX/DRX patterns that are defined by the BS.

In an example, gNB's activities (e.g., SSB, CG PUSCH, etc.) outside UE DRX active time may be reduced.

In an example, reducing periodically transmitted/semi-static configured channels/signals (e.g., SSB, SIB, CG PUSCH etc.) during the longer inactivity periods (i.e., outside UE's DRX active time) may be used.

In an example, UE DRX on/off periods may be controlled for multiple DRX cycles with an indication. This may include group level indication, such as UE-group signaling or cell-specific signaling, UE DRX command such as DRX enhanced command MAC CE and long DRX commend MAC CE.

An example time domain technique for network energy saving may be based on adaptation of BS network energy saving/power saving/dormant state. In an example, gNB may enter into the network energy saving/power saving/dormant state for a period of time based on an indication of entering or exiting the network energy saving/power saving/dormant state, e.g., in terms of start time and duration. In an example, entering or exiting the network energy saving/power saving/dormant state may be controlled based on semi-static and/or dynamic signaling. In an example, group common signaling may be used for the signaling.

An example frequency domain technique for network energy saving may be based on multi-carrier energy saving. In an example, SCells may be operated without or with reduced transmission and reception of periodic signals and channels such as SSB, SI, and CSI-RS for mobility measurements, PRACH, paging, etc. In an example, a mechanism may be used for UE to trigger normal SSB/SIB1 transmission on a SCell for fast access, e.g., if the SCell cannot share synchronization with PCell. In an example, SSB-less cell operations and potential enhancements for SSB-less cells, e.g., supporting SSB-less cell operation for inter-band CA, and supporting offloading system information from one cell to another for inter-band CA may be leveraged.

An example frequency domain technique for network energy saving may be based on dynamic adaptation of bandwidth part of UE(s) within a carrier. In an example, UE group-common or cell-specific BWP configuration and/or switching may be used.

An example frequency domain technique for network energy saving may be based on dynamic adaptation of bandwidth of UE(s) within a BWP and/or dynamic adaptation of a resource grid in a carrier. In an example, group-common signaling may be used to adapt the bandwidth of active BWP and operating in same BWP may be continued without BWP switching.

In an example, to make cells in dormant/power saving/network energy saving (NES) state discoverable, the UE may determine that such cells are present, e.g., based on the detection of a downlink signal such as an SSB associated with NES, e.g., a light version of SSB (e.g., a DRS) for cell discovery and synchronization. The UE may perform measurements on such cells and report these measurements or provide UE assistance information.

In an example, a wake-up request may be transmitted by a UE when the serving cell is in network energy saving state.

In an example, a UE in any RRC state may use wakeup signal (WUS) to send wakeup request to a neighbor cell in dormant/power saving/energy saving state. If a UE is in IDLE/INACTIVE state, when conditions for neighbor cell measurement are met, the UE may send WUS to indicate waking up a dormant/power saving/energy saving neighbor cell for neighbor cell assessment/measurement. If a UE is in CONNECTED state, the serving cell may command the UE to send WUS to the sleep neighbor cell. If the measurement of neighbor cell satisfies the handover conditions, the serving cell may indicate handover to the UE, based on the UE being in the vicinity of the just-waken-up neighbor cell.

In an example, the UE may identify a cell that is in a dormant/power saving/energy saving state based on long-period SSB (e.g., SSB with 160 ms periodicity). In an example, the UE may identify a cell that is in the dormant/power saving/energy saving state based on receiving periodic and/or on-demand reference signal(s) to aid discovery of the cell.

In an example, from gNB/cell's side, it may continuously monitor for the wakeup request/WUS or may set up periodical wakeup request/WUS monitoring occasions.

In an example, the UE may monitor the PDCCH occasion following the WUS occasion once it transmits a WUS. In an example, the gNB may treat UE WUS as a kind of UE assistance information, and the gNB may decide to exit the dormant/power saving/energy saving state once it detects enough number of UEs sending wakeup requests.

In an example, with on-demand SSB/SIB1, the transmission of SSB/SIB1 may be triggered by an uplink signal, e.g., a wakeup request/wakeup signal (WUS). In an example, the SSB/SIB1 may be transmitted by the base station in response to receiving the wakeup request/wakeup signal (e.g., for a per-configured/configurable duration starting from a timing of receiving the wakeup request or starting from an offset after the timing of receiving the wakeup request) and may not be transmitted when the uplink trigger signals is not detected by the base station. In an example, the UE may achieve time-frequency synchronization with gNB before uplink trigger signal transmission. In an example, for on-demand SSB scheme, necessary synchronization signal may be needed. In an example, a light/relaxed SSB, e.g., discovery reference signal (DRS) may be used a as synchronization signal.

In an example, a signal that is a light version of SSB (e.g., a two-symbol DRS) may be transmitted via a cell that is in a dormant/power saving/energy saving state. The signal (e.g., the DRS) may comprise SSS and PSS for downlink synchronization and cell discovery. For example, the signal may occupy 20 RB in the frequency domain. For example, the periodicity of the signal may be 20 ms. In an example, the time-frequency resources of WUS occasions for UE sending WUS may be indicated by the signal (e.g., by the DRS). In some examples, the interval between two consecutive WUS occasions may be 20 ms. Upon receiving WUS in a WUS occasion by the base station, the base station may start to broadcast SSBs and/or SIB1 according to a pre-configured/configured periodicity (e.g., N times periodically from the next SSB-burst).

In example embodiments, one or more cells provided by a base station may be in a dormant/power saving/network energy saving (NES) state. In an example, a base station that provides at least one cell that is in the NES state may be referred to as a base station in the NES state.

In example embodiments, a dormant/power saving/NES state may be associated with reduced/paused/stopped transmissions (e.g., for a duration) of one or more downlink signals/channels and/or one or more uplink signals/channels. For example, the dormant/power saving/NES state may be associated with varying a periodicity and/or changing transmission pattern and/or stopping transmission (e.g., in/during a duration) of at least one of a synchronization signal block (SSB), system information (e.g., a SIB, e.g., a SIB1), paging, a downlink reference signal (e.g., CSI-RS), random access occasions/opportunities/messages, common signal or channel (e.g., a group common PDCCH), wireless device-specific signal or channel (e.g., SPS PDSCH, PUCCH carrying SR, PUCCH carrying HARQ ACK for SPS, configured grant PUSCH, SRS, PUCCH/PUSCH carrying CSI reports, positioning RS), wireless device assistance information, buffer status report, etc. For example, the dormant/power saving/NES state may be associated with a light version of a downlink signal/channel, e.g., a light version of the downlink signal/channel in/during a duration. For example, the light version of the downlink signal/channel may be a light version of SSB (e.g., a discovery reference signal (DRS) instead of SSB for aiding in downlink synchronization and cell search), a light version of paging, a light version of common signal/channel (e.g., a common/group common PDCCH), a light version of downlink reference signal (e.g., CSI-RS).

In an example embodiment, a wireless device may determine that a base station or at least a first cell, provided by the base station, that is/are in the dormant/power saving/NES state is/are required to be waken up from the NES state to a normal/non-NES state. The determination may be based on a process to be performed by the wireless device (e.g., an initial access process, reception of random access messages (e.g., RAR/MsgB), etc.).

Figure 16:
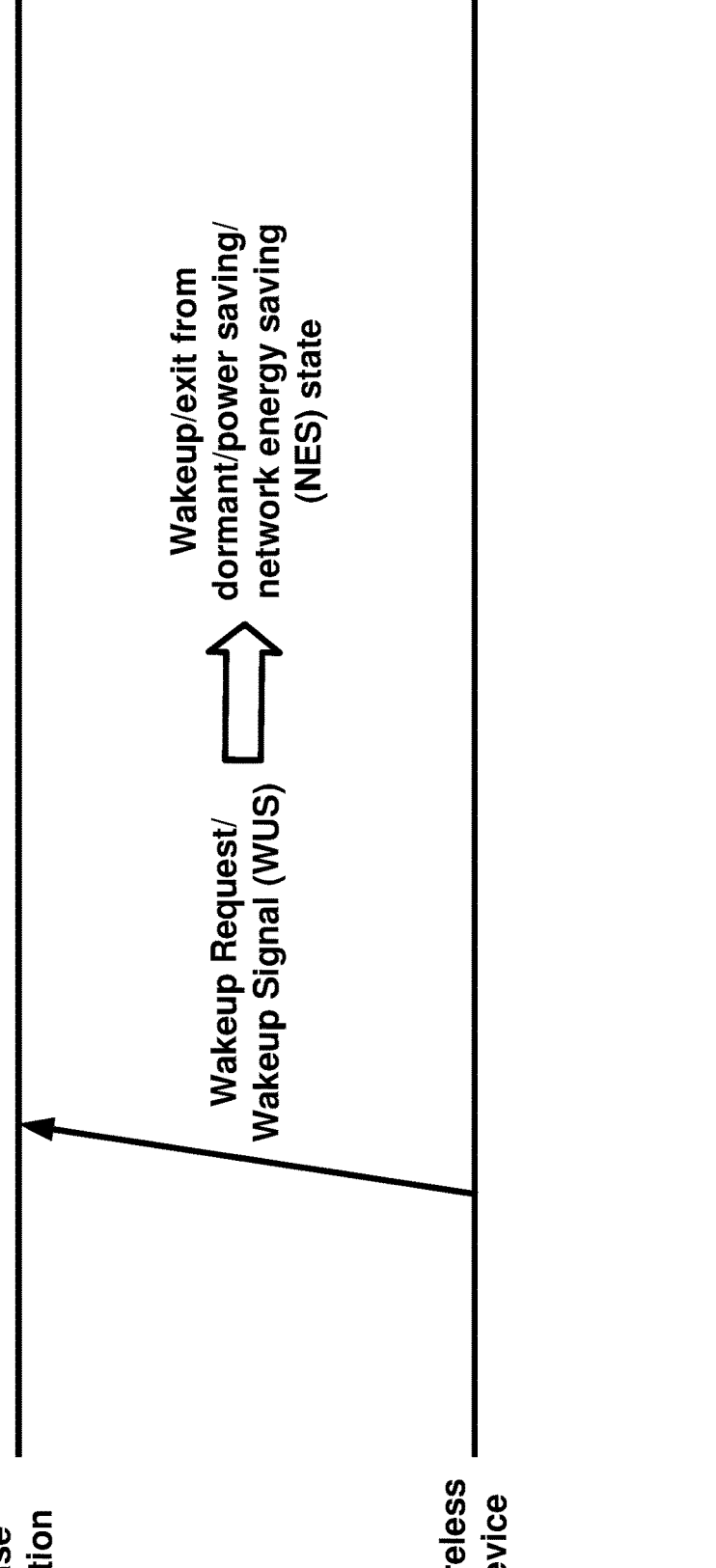
FIG. 16 shows an example process in accordance with several of various embodiments of the present disclosure.

In an example embodiment as shown in FIG. 16, the wireless device may transmit, for example in response to the determination by the wireless device that the base station or the at least first cell provided by the base station that is/are in the NES state is/are required to be waken up/exit from the NES state to the normal/non-NES state, a wakeup request/wakeup signal (WUS) to the base station. The wakeup request/wakeup signal (WUS) may indicate a request to wake up/exit from the dormant/power saving/NES state.

In an example, the transmission of the wakeup request/WUS and/or the determination that the base station or the at least first cell provided by the base station that is/are in the NES state is/are required to be waken up/exit from the NES state to the normal/non-NES state may be based on/in response to one or more conditions/events. In an example, the one or more conditions/events may comprise handover/determination of handover to a cell that is in the dormant/power saving/NES state. In an example, the one or more conditions/events may comprise initiation of a random access process or transmission of a random access message (e.g., Msg1/MsgA) on/via a cell that is in the dormant/power saving/NES state. In an example, the one or more conditions/events may comprise arrival of data of a logical channel, e.g., a logical channel with high priority. For example, the wireless device may receive a configuration parameter of the logical channel, the configuration parameter indicating that arrival of data of the logical channel triggers transmission of the wakeup request/WUS. In an example, the one or more conditions/events may comprise detection of a beam failure for a cell that is in a dormant/power saving/NES state. In an example, the one or more conditions/events may comprise detection of a listen-before-talk (LBT) failure (e.g., detection of consistent LBT failure) for a cell that is in the dormant/power saving/NES state. In an example, the one or more conditions/events may comprise expiry of timer. For example, the timer may be a time alignment timer associated with a time alignment timer group (TAG), e.g., a TAG comprising a cell that is in the dormant/power saving/energy saving state. For example, the timer may be a BWP inactivity timer of a BWP, e.g., BWP of a cell that is in a dormant/power saving/NES state. In an example, the one or more conditions/events may comprise triggering a scheduling request, for example triggering a scheduling request associated with a first scheduling request configuration. For example, the wireless device may receive configuration parameters of the first scheduling request configuration, the configuration parameters comprising a first parameter indicating that triggering a scheduling request associated with the scheduling request configuration triggers a wakeup request/WUS (e.g., when a cell configured with PUCCH resources for SR transmission is in the dormant/power saving NES state). In an example, the one or more conditions/events may comprise triggering a buffer status report, e.g., buffer status report indicating data of a logical channel or a logical channel group. For example, the wireless device may receive configuration parameters indicating that availability of data of a logical channel/logical channel group or reporting data of the logical channel/logical channel group in a buffer status report triggers a wakeup request/WUS.

In an example, transmitting the wakeup request/wakeup signal may be based on/via resources that are pre-configured or are configured based on receiving configuration parameters (e.g., configuration parameters of the uplink control information (UCI), e.g., for CSI, SR, etc., configuration parameters of a reference signal, configuration parameters for random access, etc.) indicating the resources/occasions to be used by the wireless device for transmission of the wakeup request/wakeup signal. For example, the configuration parameters may indicate a periodicity associated with the resources/occasions configured for transmission of the wakeup request/WUS. The wireless device may determine the resources/occasions configured for transmission of the wakeup request/WUS based on the configuration parameters.

In an example, the wireless device may receive, from the base station, configuration parameters of one or more cells provided by the base station. The wakeup request/WUS may be for/associated with/directed to one or more first cells of the one or more cells configured for the wireless device. The one or more first cells may be in the dormant/power saving/NES state that are request, by the wakeup request/WUS, to wake up from the dormant/power saving/NES state. The wakeup request/WUS may indicate (e.g., may comprise one or more fields with values indicating) the one or more first cells, for example by indicating identifiers of/associated with the one or more first cells. In an example, the wakeup request/WUS may be for/associated with/directed to the base station and the wakeup request/WUS may indicate (e.g., may comprise a field with a value indicating) that the wakeup request/WUS is for/associated with/directed to the base station (e.g., by indicating an identifier associated with the base station). In this case, the wakeup request/WUS may be for/associated with one or more first cells, of one or more cells provided by the base station, that are in the dormant/power saving/NES state.

In an example, the wireless device may transmit the wakeup request/WUS via a cell that is in the dormant/power saving/NES state, e.g., via the same cell that is requested to wake up form the dormant/power saving/energy saving state.

In an example, the wireless device may transmit the wakeup request/WUS via a cell that is not in the dormant/power saving/energy saving state, e.g., via a cell different from one or more first cells of the base station that are in the dormant/power saving/NES state.

In an example, the wakeup request/WUS may indicate a change from an SSB-less or SSB with relaxed/light transmission (e.g., via a simplified version of SSB such as a discovery signal) and/or SSB with low periodicity to normal SSB transmission, e.g., according to a normal periodicity and/or non-relaxed/non-light/full SSB transmission. The light/simplified version of SSB (e.g., discovery signal transmission) may be used by the wireless devices to discover a cell or to aid the wireless device for downlink synchronization while the light/simplified version of the SSB or SSB transmission with low periodicity may result in energy saving by the network.

In an example, the wakeup request/WUS may indicate a request for change from a system information-less (e.g., a SIB-less or a SIB1-less transmission) to system information (e.g., SIB1) transmission. In an example, the wakeup request/WUS may indicate a request for change from a first periodicity of system information (e.g., a SIB or a SIB1) to a second periodicity of system information.

In an example, the wakeup request/WUS may indicate a request for change from a paging-less or relaxed/light paging transmission to normal paging transmission (e.g., according to a normal periodicity or non-relaxed/non-light/full paging transmission). In an example, the wakeup request/WUS may indicate a request for change from a first periodicity/cycle duration associated with paging to a second periodicity/cycle duration associated with the paging.

In an example, the wakeup request/WUS may indicate a request for change from no or relaxed/light common signal/channel (e.g., common PDCCH) transmission to normal common signal/channel transmission (e.g., according to a normal periodicity or non-relaxed/non-light/full common signal/channel transmission). In an example, the wakeup request/WUS may indicate a request for change from a first periodicity associated with the common signal/channel to a second periodicity associated with the common signal/channel.

In an example, the wakeup request/WUS may indicate a request for change from no or relaxed/light UE-specific signal/channel transmission to normal UE-specific signal/channel transmission (e.g., according to a normal periodicity or non-relaxed/non-light/full UE-specific signal/channel transmission). In an example, the wakeup request/WUS may indicate a request for change from a first periodicity associated with the UE-specific signal/channel to a second periodicity associated with the UE-specific signal/channel.

In an example, the wakeup request/wakeup signal (WUS) may indicate (e.g., may comprise a field with a value indicating) a first configuration and/or a first periodicity (e.g., among a plurality of configurations/periodicities, e.g., by providing an index to the first configuration/periodicity in the plurality of configurations/periodicities). The first configuration/periodicity may be associated with SSB (e.g., light SSB e.g., discovery signal) and/or system information (e.g., a SIB, e.g., SIB1) and/or paging and/or a common signal/channel (e.g., a common PDCCH) and/or a UE-specific signal/channel. The receiving or transmitting of the SSB/system information/common signal/channel/wireless device specific signal/channel may be after/in response to changing from the dormant/power saving/NES state to a non-NES state or after exiting the dormant/power saving/NES state.

In an example, the wakeup request/WUS may be based on uplink control information and may be transmitted via PUCCH or PUSCH. For example, the UCI used for transmission of the wakeup request/WUS may be based on a scheduling request, e.g., a scheduling request associated with a first scheduling request configuration. For example, the UCI used for transmission of the wakeup request/WUS may be based on a report (e.g., a CSI report) and/or based on a report configuration (e.g., a CSI report configuration).

In an example, the wireless may receive configuration parameters of one or more scheduling request configurations, comprising the first scheduling request configuration, that are associated with wakeup request/WUS, e.g., for requesting to change from a dormant/power saving/NES state to a normal/non-NES state. In an example, the one or more SR configuration may indicate changing a base station from the dormant/power saving/NES state to the normal/non-NES state, e.g., changing one or more first cells of/provided by the base station that are in the dormant/power saving/NES state to the normal/non-NES state. In an example, a first SR configuration, in the one or more SR configurations, may indicate a first periodicity and/or a first configuration of SSB/discovery signal and/or system information (e.g., a SIB, e.g., SIB1) and/or paging and/or a common signal/channel and/or a UE-specific signal/channel for the wireless device after changing from the dormant/power saving/NES state to the non-NES state/normal state. In an example, a first SR configuration, in the one or more SR configurations, may indicate one or more first cells that the wakeup request/WUS is for/associated with/directed to. The SR wireless device may receive an uplink grant in response to transmitting the SR and may transmit the wakeup request/WUS (e.g., a MAC CE associated with the wakeup request/wakeup signal).

In an example, the UCI used by the wireless device for transmission of the wakeup request/WUS may be based on a report (e.g., CSI report) and/or based on a report configuration (e.g., CSI report configuration). The report (e.g., the CSI report) may comprise information associated with the wakeup request/WUS, e.g., one or more first cells that the wakeup request/WUS is for/associated with/directed to, a periodicity/configuration associated with a signal or channel (e.g., SSB/discovery signal, SIB e.g., SIB1, common signal/channel (e.g., common PDCCH), UE-specific signal/channel, etc.) after/in response to waking up/exiting from the dormant/power saving/NES state, etc.

In an example, the UCI used for transmission of the wakeup request/WUS may be via/based on (e.g., via PUCCH/PUSCH resources of) a cell that is in the dormant/power saving/NES state and is requested to wake up/exit from the dormant/power saving/NES state to the normal/non-NES state.

In an example, the UCI used for transmission of the wakeup request/WUS may be transmitted via/based on (e.g., via PUCCH/PUSCH resources of) a cell that is not in the dormant/power saving/NES state, for example may be via/based on a cell that is not one of the one or more first cells that are in the dormant/power saving/NES state. The UCI may comprise one or more fields with values indicating the one or more first cells (e.g., indicating identifiers of the one or more first cells) that are in the dormant/power saving/NES state and are requested to wake up or exit from the dormant/power saving/NES state. For example, the wireless device may receive one or more configuration parameters (e.g., RRC configuration parameters) wherein each configuration parameter, in the one or more configuration parameters, is mapped to one or more cells. For example, the wireless device may receive a configuration parameter with one or more values, wherein each value, in the one or more values, is mapped to one or more cells. A value of a field of the UCI may indicate the one or more first cells that are requested to wake up/exit from the dormant/power saving/NES state based on the value of the field being/being mapped to a first configuration parameter in the one or more configuration parameters or to a first value in the one or more values.

In an example, the UCI used for transmission of the wakeup request/WUS may be transmitted via/based on first radio resources and the first radio resources may indicate the one or more first cells for which wakeup from the dormant/power saving/NES is requested.

In an example, the wakeup request/WUS may be based on medium access control (MAC) control element (CE). The wireless device may multiplex the MAC CE in a transport block and may transmit the MAC CE via PUSCH. The MAC CE may be associated with an LCID. In an example, the LCID associated with the MAC CE may indicate that the MAC CE is for wakeup request from the dormant/power saving/NES state. The MAC CE payload (e.g., value of one or more fields of the MAC CE) may comprise/indicate information associated with the wakeup request. For example, a first value of a field of the MAC CE may indicates a first periodicity (e.g., a first periodicity in a plurality of periodicities e.g., configured periodicities) and/or a first configuration (e.g., a first configuration in a plurality of configurations) of/associated with a SSB/discovery signal and/or system information (e.g., a SIB, e.g., SIB1) and/or paging and/or a common signal/channel (e.g., common PDCCH) and/or a UE-specific signal/channel that is requested by the UE after changing from the dormant/power saving/NES state to the non-NES/normal state. For example, a value of a field of the MAC CE may indicate one or more first cells (e.g., identifier of the one or more first cells) that are in the dormant/power saving/energy saving state and are requested to wake up/exit from the dormant/power saving/ energy saving state. For example, the wireless device may receive one or more configuration parameters (e.g., RRC configuration parameters) wherein each configuration parameter, in the one or more configuration parameters, is mapped to one or more cells. For example, the wireless device may receive a configuration parameter with one or more values, wherein each value, in the one or more values, is mapped to one or more cells. A value of a field of the MAC CE may indicate the one or more first cells that are requested to wake up/exit from the dormant/power saving/NES state based on the value of the field being/being mapped to a first configuration parameter in the one or more configuration parameters or to a first value in the one or more values.

In an example, the wakeup request/WUS may be based on an uplink reference signal (e.g., a SRS or an SRS-like uplink reference signal). The wireless device may receive configuration parameters of the SRS or the SRS-like reference signal. In an example, the configuration parameters may comprise a first parameter indicating that the SRS or the SRS-like configuration is associated with wakeup request/WUS. In an example, a sequence number associated with the SRS or the SRS-like uplink reference signal and/or a pattern (e.g., a comb pattern, e.g., a pattern indicating radio resources e.g., resource blocks that are occupied for transmission of the SRS or the SRS-like reference signal) associated with the SRS or the SRS-like reference signal and/or radio resources (e.g., radio resources used in transmission) associated with the SRS or the SRS-like reference signal may indicate a request for change from a dormant/power saving/NES state to a normal/non-NES state.

In an example, a first sequence number associated with the SRS or the SRS-like uplink reference signal and/or a first pattern (e.g., a first comb pattern, e.g., a first pattern indicating first radio resources e.g., first resource blocks that are occupied for transmission of the SRS or the SRS-like reference signal) associated with the SRS or the SRS-like reference signal and/or first radio resources (e.g., first radio resources used in transmission) associated with the SRS or the SRS-like reference signal may indicate that a first periodicity and/or a first configuration (e.g., in a plurality of periodicities or in a plurality of configurations) of SSB/discovery signal/system information (e.g., a SIB e.g., SIB1)/paging/common signal/channel, UE-specific signal/channel is requested by the wireless device after changing from the dormant/power saving/NES state to the non-NES/normal state.

In an example, a first sequence number associated with the SRS or the SRS-like uplink reference signal and/or a first pattern (e.g., a first comb pattern, e.g., a first pattern indicating first radio resources e.g., first resource blocks that are occupied for transmission of the SRS or the SRS-like reference signal) associated with the SRS or the SRS-like reference signal and/or first radio resources (e.g., first radio resources used in transmission) associated with the SRS or the SRS-like reference signal may indicate one or more first cells that the wakeup request is for/associated with/directed to.

In an example, the wakeup request/WUS may be based on a random access message (e.g., a Msg1, Msg3, MsgA) in a random access process. For example, the wireless device may receive random access configuration parameters indicating one or more random access preambles and/or one or more random access occasions, wherein the one or more random access preambles/the one or more random access occasions, used by the wireless device in a random access process, indicate a request for change from a dormant/power saving/NES state to the non-NES/normal state. For example, the wireless device may multiplex data associated with the wakeup request/WUS (e.g., a MAC CE associated with the wakeup request) in a random access message (e.g., in a Msg3 in response to receiving an uplink grant via RAR or in Msg A) indicating a request for change from a dormant/power saving/NES state to the non-NES/normal state. In an example, a random access preamble/occasion/configuration used by the wireless device may indicate that a first periodicity and/or a first configuration (e.g., in a plurality of periodicities or in a plurality of configurations) of/associated with SSB/discovery signal/system information (e.g., a SIB e.g., SIB1)/paging/common signal/channel, UE-specific signal/channel that is requested by the wireless device after changing from the dormant/power saving/NES state to the non-NES/normal state. In an example, the one or more random access preambles/the one or more random access occasions, used by the wireless device in the random access process, or the data associated with the wakeup request that is multiplexed in the random access message (e.g., in a Msg3 in response to receiving an uplink grant via RAR or in Msg A) may indicate one or more first cells that the wakeup request is for/associated with/directed to.

Figure 17:
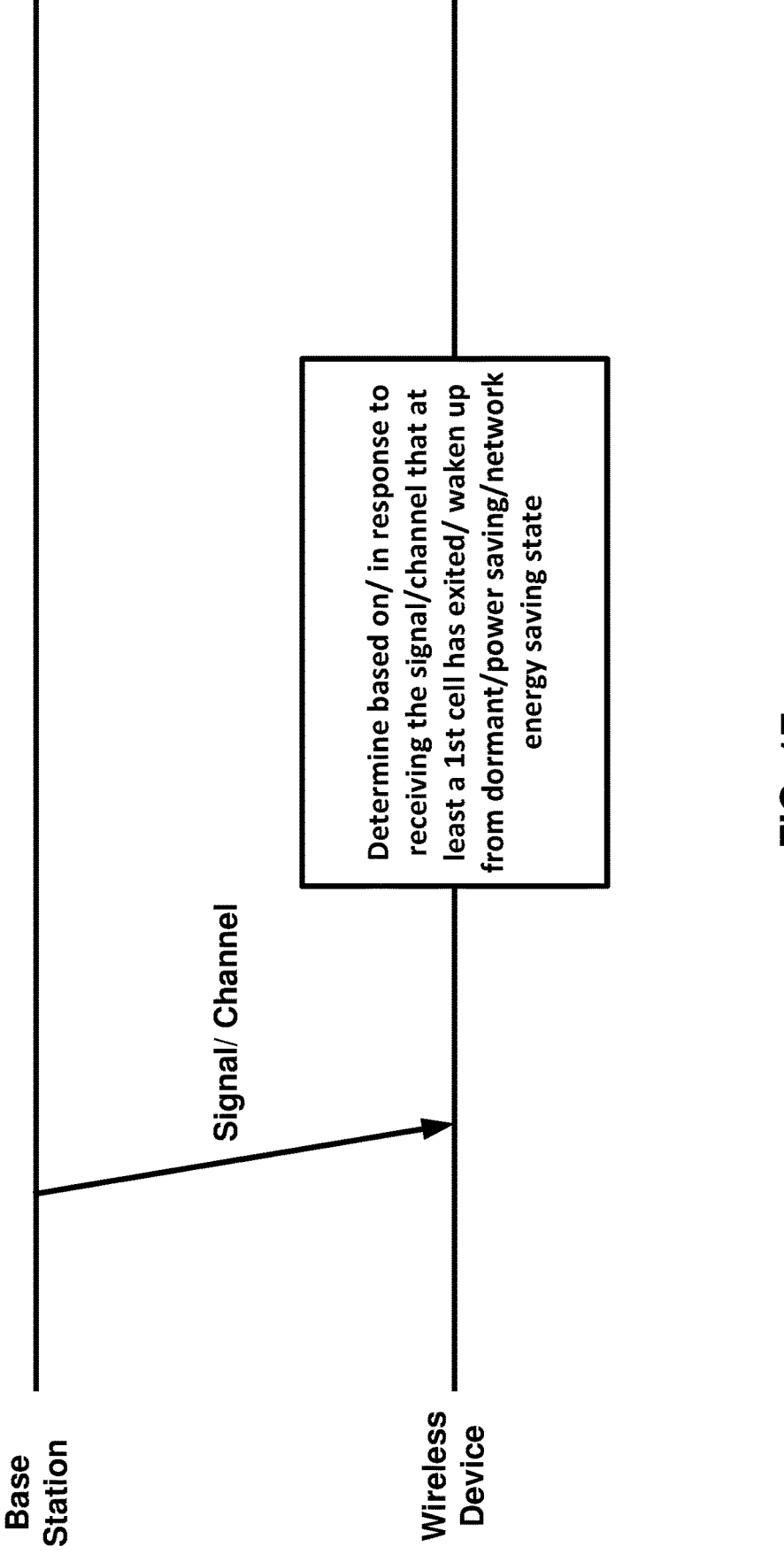
FIG. 17 shows an example process in accordance with several of various embodiments of the present disclosure.

In an example embodiment, at least a first cell provided by a base station may be in a dormant/power saving state/NES state. In an example embodiment as shown in FIG. 17, a wireless device may receive a signal or channel indicating that at least the first cell provided by the base station has exited/waken up from a dormant/power saving/NES state to a non-NES/normal state. The wireless device may determine that the at least the first cell provided by the base station has exited/waken up from the dormant/power saving/NES state to the non-NES/normal state.

In an example, the base station may transmit, and the wireless device may receive the signal/channel via a first cell of the at least one first cell that are in the dormant/power saving/NES state. In an example, the signal/channel may be transmitted for/associated with the first cell. For example, the signal/channel (e.g., a DCI in case a DCI is used for the indication that the at least one first cell has exited/waken up from the dormant/power saving/NES state) may comprise a field with a value indicating the first cell (e.g., indicating that the signal/channel is for/associated with the first cell).

In an example, the base station may transmit, and the wireless device may receive the signal/channel via a cell that is not in the one or more first cells that are in the dormant/ power saving/energy saving state. For example, the signal/ channel (e.g., a DCI in case a DCI is used for the indication that the at least one first cell has exited/waken up from the dormant/power saving/NES state) may comprise a field with a value indicating the first cell (e.g., indicating that the signal/channel is for/associated with the first cell).

In an example, the DCI may be a scheduling DCI, e.g., a PDSCH scheduling DCI or a PUSCH scheduling DCI. In an example, the DCI may be an activation DCI. For example, the DCI may be a downlink SPS activation DCI indicating activation of a downlink SPS configuration. For example, the DCI may be a configured grant activation DCI indicating activation of an uplink configured grant configuration. For example, the DCI may be an activation DCI for semi-persistent CSI reporting via PUSCH. For example, the DCI may be activation DCI for transmission of semi-persistent CSI-RS.

In an example, the signal/channel may be a physical downlink control channel (PDCCH) order indicating initiation of a random access process.

In an example, the signal channel may be associated with a random access process. For example, the signal/channel may be used for transmission of a random access message (e.g., Msg2, Msg4, Msg B).

In an example, the signal/channel may be used for transmission of a MAC CE (e.g., a a SP CSI-RS/CSI-IM set activation/deactivation MAC CE, a TCI States Activation/ Deactivation for UE-specific PDSCH MAC CE, a TCI State Indication for UE-specific PDCCH MAC CE, a SP ZP CSI-RS Resource Set Activation/Deactivation MAC CE).

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 18:
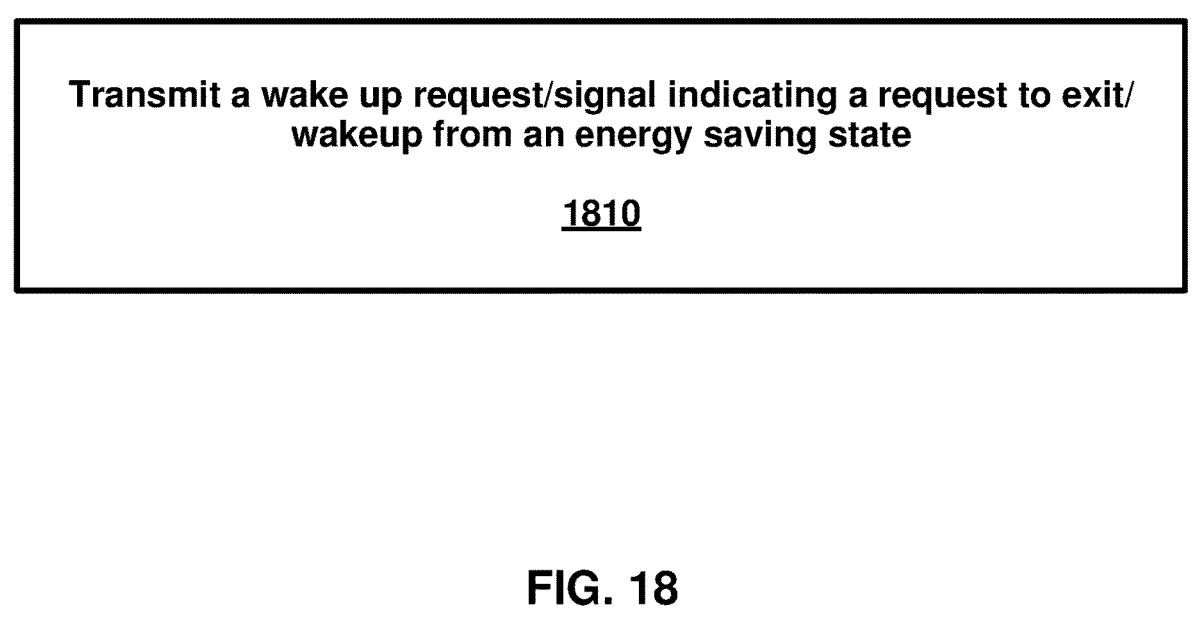

FIG. 18 shows an example flow diagram in accordance with several of various embodiments of the present disclosure. At 1810, a wireless device may transmit a wake up request indicating a request to exit an energy saving state (e.g., a network energy saving (NES) state) for one or more cells. At least one uplink transmission or at least one downlink transmission may not be performed during an energy saving state.

In an example embodiment, a wireless device may transmit, at 1810, to a base station, a wakeup request/wakeup signal (WUS) indicating a request to wake up/exit from a dormant/power saving/network energy saving (NES) state.

In an example embodiment, the dormant/power saving/ network energy saving (NES) state may be associated with one or more of: varying a periodicity and/or changing transmission pattern and/or stopping transmission (e.g., in/during a duration) of at least one of: a synchronization signal block (SSB), system information (e.g., a SIB, e.g., a SIB1), paging, a downlink reference signal (e.g., CSI-RS), random access occasions/opportunities/messages, common signal or channel (e.g., a group common PDCCH), wireless device-specific signal or channel (e.g., SPS PDSCH, PUCCH carrying SR, PUCCH carrying HARQ ACK for SPS, configured grant PUSCH, SRS, PUCCH/PUSCH carrying CSI reports, positioning RS), wireless device assistance information, buffer status report, etc.; and transmitting (e.g., for a duration) a light version of SSB (e.g., a discovery reference signal (DRS) instead of SSB for aiding in downlink synchronization/cell search) and/or a light version of paging and/or a light version of common signal/channel (e.g., common PDCCH) and/or a light version of a downlink reference signal (e.g., CSI-RS).

In an example embodiment, the wakeup request/wakeup signal, transmitted at 1810, may be triggered based on/in response to one or more of: handover to a cell that is in the dormant/power saving/NES state; initiation of a random access process or transmission of a random access message (e.g., Msg1/MsgA) on a cell that is in the dormant/power saving/NES state; arrival of data of a logical channel, e.g., a logical channel with high priority (e.g., based on a configuration parameter of the logical channel indicating arrival of data of the logical channel triggering wakeup request/ wake up signal); detection of a beam failure for a cell that is in a dormant/power saving/NES state; detection of listen-before-talk (LBT) failure (e.g., consistent LBT failure) for a cell that is in a dormant/power saving/NES state; expiry of a time alignment timer associated with a timing advance group comprising a cell that is in a dormant/power saving/ NES state; expiry of a bandwidth part (BWP) inactivity timer of a BWP of a cell that is in a dormant/power saving/NES state; triggering a scheduling request associated with a first scheduling request configuration; triggering a buffer status report indicating data of a first logical channel, e.g., a logical with high priority (e.g., based on a configuration parameter of the logical channel indicating arrival of data of the logical channel triggering wakeup request/wake up signal).

In an example, transmitting the wakeup request/wakeup signal (WUS), at 1810, may be based on pre-configured resources/occasions or configured resources/occasions. In an example, the wireless device may receive configuration parameters indicating the resources/occasions for transmission of the wakeup request/wakeup signal (WUS). In an example, the configuration parameters may be associated with an uplink control information (UCI) configuration or a reference signal configuration or a random access configuration. In an example, the configuration parameters may comprise a first parameter indicating a periodicity. In an example, the wireless device may determine the resources/occasions for transmission of the wakeup request/wakeup signal (WUS) based on the configuration parameters.

In an example, the wireless device configuration parameters of one or more cells. In an example, the wakeup request/wakeup signal (WUS) may be for/associated with/directed to one or more first cells in one or more cells configured for the wireless device. In an example, the wakeup request/wakeup signal (WUS) may indicate (e.g., may comprise a field with a value indicating) the one or more first cells (e.g., identifiers of/associated with the one or more first cells) that the wakeup request/wakeup signal (WUS) is for/associated with/directed to. In an example, the one or more first cells may be in the dormant/power saving/network energy saving (NES) state.

In an example, the wakeup request/wakeup signal (WUS), transmitted at 1810, may be for/associated with/directed to the base station. In an example, the wakeup request/wakeup signal (WUS) may indicate (e.g., may comprise a field with a value indicating) the base station (e.g., an identifier of/associated with the base station) that the wakeup request/wakeup signal (WUS) is for/associated with/directed to. In an example, the wakeup request/wakeup signal (WUS) may be for/associated with one or more first cells, of one or more cells of/provided by the base station and configured for the wireless device, that are in the dormant/power saving/network energy saving (NES) state.

In an example, the wakeup request/wakeup signal (WUS) may be for requesting to change: the dormant/power saving/NES state of one or more first cells to a non-NES/normal state; or the dormant/power saving/NES state of a base station (e.g., one or more first cells provided by the base station that are in the dormant/power saving/NES state) to a non-NES/normal state.

In an example, the transmitting the wakeup request/wakeup signal (WUS), at 1810, may be via the same cell that is in the dormant/power saving/NES state and is requested to wake up.

In an example, the transmitting the wakeup request/wakeup signal (WUS), at 1810, may be via a cell that is different from a cell that is the dormant/power saving/NES state and is requested to wake up.

In an example, the wakeup request/wakeup signal (WUS), transmitted at 1810, may indicate a request for change from an SSB-less or a relaxed/light SSB transmission state (e.g., with low periodicity of SSB transmission and/or light SSB transmission) to normal SSB transmission (e.g., according to a normal periodicity and/or non-relaxed/non-light/full SSB transmission).

In an example, the wakeup request/wakeup signal (WUS), at 1810, may indicate a request for change from a system information (e.g., a SIB, e.g., SIB1)-less state to system information (e.g., SIB1) transmission.

In an example, the wakeup request/wakeup signal (WUS), transmitted at 1810, may indicate a request for change from a paging-less or relaxed/light paging transmission to normal paging transmission (e.g., according to a normal periodicity or non-relaxed/non-light/full paging transmission).

In an example, the wakeup request/wakeup signal (WUS), transmitted at 1810, may indicate a request for change from relaxed or no common signals/channels (e.g., common PDCCH) transmission to normal common signals/channels transmission.

In an example, the wakeup request/wakeup signal (WUS), transmitted at 1810, may indicate a request for change from relaxed or no UE-specific signals/channels transmission to normal signals/channels transmission.

In an example, the wakeup request/wakeup signal (WUS), transmitted at 1810, may indicate a configuration and/or a periodicity (e.g., among a plurality of configurations/periodicities, e.g., by providing an index to the configuration/periodicity in the plurality of configurations/periodicities) associated with SSB and/or system information (e.g., a SIB, e.g., SIB1) and/or paging and/or a common signal/channel (e.g., a common PDCCH) and/or a UE-specific signal/channel after changing from the dormant/power saving/NES state to a non-NES state or after exiting the dormant/power saving/NES state.

In an example, the wakeup request/wakeup signal (WUS), transmitted at 1810, may be based on one or more of uplink control information (UCI) (e.g., for transmission via PUCCH or PUSCH), medium access control (MAC) control element (CE), an uplink reference signal such as a sounding reference signal (SRS) or an SRS-like uplink reference signal, and a random access message (e.g., a random access preamble or a MsgA).

In an example, the wakeup request/wakeup signal (WUS), transmitted at 1810, may be based on uplink control information (UCI) (e.g., for transmission via PUCCH or PUSCH). In an example, the UCI may be based on a scheduling request (SR) configuration. In an example, the wireless device may receive configuration parameters of one or more SR configurations that are associated with wakeup request/wakeup signal (WUS). In an example, the wakeup request/wakeup signal (WUS) may be for requesting to change from a dormant/power saving/NES state to a non-NES/normal state. In an example, the one or more SR configurations may indicate a request for changing one or more first cells from the dormant/power saving/NES state to the non-NES state/normal or change a base station (e.g., one or more first cells provided by the base station) from the dormant/power saving/NES state to the non-NES/normal state. In an example, a first SR configuration, in the one or more SR configurations, may indicate a first periodicity and/or a first configuration of SSB and/or system information (e.g., a SIB, e.g., SIB1) and/or paging and/or a common signal/channel and/or a UE-specific signal/channel for the wireless device after changing from the dormant/power saving/NES state to the non-NES state/normal state. In an example, a first SR configuration, in the one or more SR configurations, may indicate one or more first cells that the wakeup request/wakeup signal (WUS) is for/associated with/directed to. In an example, the wireless device may receive an uplink grant in response to transmitting a SR associated with the SR configuration. In an example, the wireless device may transmit a MAC CE (e.g., a transport block comprising a MAC CE) associated with/for the wakeup request. In an example, the UCI may be for transmission of/based on a report (e.g., a channel state information (CSI) report) and/or may be based on a report configuration (e.g., CSI report configuration). In an example, the report (e.g., the CSI report) may comprise information associated with the wakeup request. In an example, transmitting the UCI for wakeup request may be on (e.g., via PUCCH/PUSCH resources of) the same cell that is in the dormant/power saving/NES state and is requested to wake up or exit from the dormant/power saving/NES state. In an example, transmitting the UCI for wakeup request may be on (e.g., via PUCCH/PUSCH resources of) a cell that is different from one or more first cells that are in the dormant/power saving/NES state and are requested to wake up or exit from the dormant/power saving/NES state. In an example, the UCI may comprise a field with a value indicating the one or more first cells that are in the dormant/power saving/NES state and are requested to wake up or exit from the dormant/power saving/NES state. In an example, the value of the field of the UCI may indicate an identifier of a first cell that is in the dormant/power saving/NES state and is requested to wake up or exit from the dormant/power saving/NES state. In an example, the wireless device may receive one or more configuration parameters (e.g., RRC configuration parameters) and the value of the field of the UCI may be mapped to the one or more first cells based on one or more configuration parameters. In an example, each configuration parameter, in the one or more configuration parameters, may be associated with one or more cells. In an example, transmitting the UCI associated with the wakeup request may be via first radio resources. The first radio resources may indicate the one or more first cells for which wakeup from the dormant/power saving/NES state is requested.

In an example, the wakeup request/wakeup signal (WUS), transmitted at 1810, may be based on a MAC CE. In an example, the MAC CE may be a payload-less MAC CE. In an example, a logical channel identifier (LCID) associated with the MAC CE may indicate that the MAC CE is for wakeup request. In an example, the MAC CE payload may comprise information associated with wakeup request. In an example, a first value of a field of the MAC CE may indicate a first periodicity (e.g., a first periodicity in a plurality of periodicities e.g., configured periodicities) and/or a first configuration (e.g., a first configuration in a plurality of configurations) of/associated with a SSB and/or system information (e.g., a SIB, e.g., SIB1) and/or paging and/or a common signal/channel (e.g., common PDCCH) and/or a UE-specific signal/channel that is requested by the UE after changing from the dormant/power saving/NES state to the non-NES/normal state. In an example, the MAC CE may comprise a field with a value indicating the one or more first cells that are in the dormant/power saving/NES state and are requested to wake up or exit from the dormant/power saving/NES state. In an example, the value of the field of the UCI may indicate an identifier of a first cell that is in the dormant/power saving/NES state and is requested to wake up or exit from the dormant/power saving/NES state. In an example, the value of the field of the MAC CE may indicate an identifier of a first cell that is in the dormant/power saving/NES state and is requested to wake up or exit from the dormant/power saving/NES state. In an example, the wireless device may receive one or more configuration parameters (e.g., one or more RRC configuration parameters). In an example, the value of the field of the MAC CE may be mapped to the one or more first cells based on one or more configuration parameters. In an example, each configuration parameter, in the one or more configuration parameters, may be associated with one or more cells.

In an example, the wakeup request/wakeup signal (WUS), transmitted at 1810, may be based on an uplink reference signal. In an example, the uplink reference signal may be a sounding reference signal (SRS) or an SRS-like reference signal. In an example, the wireless device may receive configuration parameters of the uplink reference signal or the sounding reference signal (SRS) or the SRS-like reference signal. In an example, a sequence number associated with the reference signal and/or a pattern (e.g., a comb pattern) and/or radio resources associated with the reference signal may indicate a request for change from the dormant/power saving/NES state to a non-NES/normal state. In an example, a first sequence number associated with the reference signal and/or a first pattern (e.g., a first comb pattern) and/or first radio resources associated with the reference signal may indicate that a first periodicity and/or a first configuration (e.g., in a plurality of periodicities or in a plurality of configurations) of SSB/system information (e.g., a SIB e.g., SIB1)/paging/common signal/channel (e.g., a common PDCCH), UE-specific signal/channel is requested by the wireless device after changing from the dormant/power saving/NES state to the non-NES/normal state. In an example, a first sequence number associated with the reference signal and/or a first pattern (e.g., a first comb pattern) and/or first radio resources associated with the reference signal indicate one or more first cells that the wakeup request is for/associated with/directed to.

In an example, the wakeup request/wakeup signal (WUS), transmitted at 1810, may be based on a random access message in a random access process. In an example, the wireless device may receive configuration parameters of one or more random access preambles and/or indicating one or more random access occasions, wherein the one or more random access preambles/the one or more random access occasions, used by the wireless device in a random access process, may indicate a request for change from a dormant/power saving/NES state to the non-NES/normal state. In an example, the random access preamble/occasion/configuration used by the wireless device may indicate that a first periodicity and/or a first configuration (e.g., in a plurality of periodicities or in a plurality of configurations) of/associated with SSB/system information (e.g., a SIB e.g., SIB1)/paging/common signal/channel (e.g., a common PDCCH), UE-specific signal/channel that is requested by the wireless device after changing from the dormant/power saving/NES state to the non-NES/normal state. In an example, the random access preamble/occasion/configuration used by the wireless device may indicate one or more first cells that the wakeup request is for/associated with/directed to.

Figure 19:
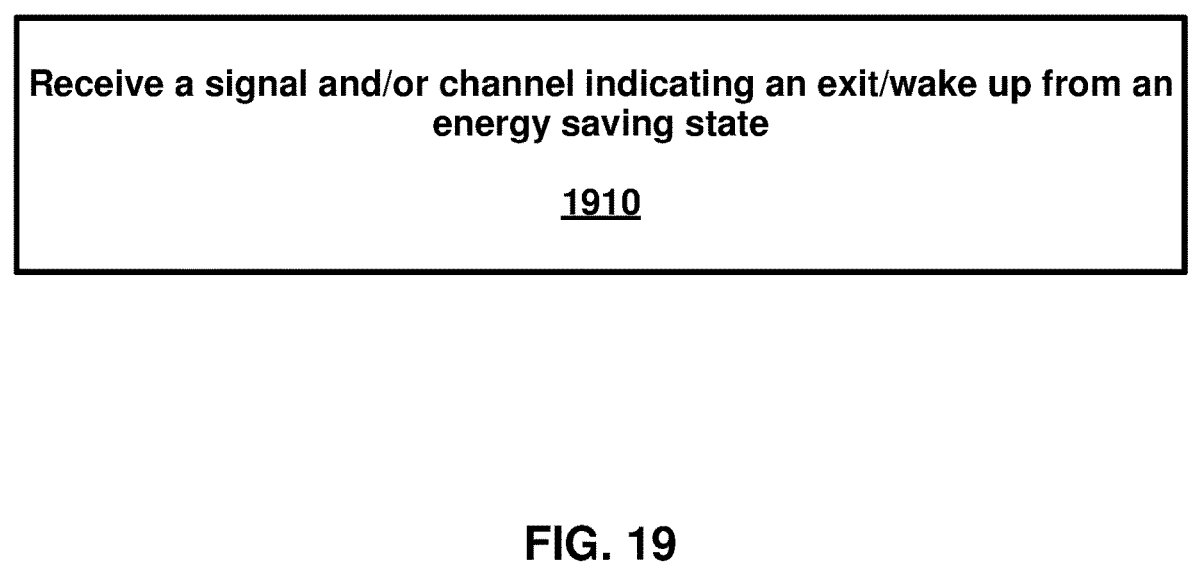

FIG. 19 shows an example flow diagram in accordance with several of various embodiments of the present disclosure. At 1910, a wireless device may receive a signal or a channel indicating that an exit or a wake up from an energy saving state (e.g., a network energy saving (NES) state). At least one uplink transmission or at least one downlink transmission may not be performed during an energy saving state.

In an example embodiment, a wireless device may receive, at 1910 from a base station, a signal or a channel. The wireless device may determine, based on the signal/channel or based on/in response to receiving the signal/channel, that at least a first cell provided by the base station has exited from a dormant/power saving/network energy saving (NES) state.

In an example, the wireless device may receive, at 1910, the signal/channel via the first cell.

In an example, the signal/channel may be for/associated with the first cell. In an example, the signal/channel may comprise a field with a value indicating the first cell (e.g., indicating that the signal/channel is for/associated with the first cell).

In an example, receiving the signal/channel, at 1910, may be via a cell different from the first cell.

In an example, the signal/channel may be a scheduling DCI.

In an example, the signal/channel may be an activation DCI. In an example, the activation DCI may be for activation of a downlink semi-persistent scheduling (SPS) configuration. In an example, the activation DCI may be for activation of an uplink configured grant configuration. In an example, the activation DCI may be for activation of semi-persistent channel state information (CSI) reference signal (SP CSI-RS) transmission. In an example, the activation DCI may be for activation of semi-persistent channel state information (CSI) reporting.

In an example, the signal/channel may be a physical downlink control channel (PDCCH) order indicating initiation of a random access process.

In an example, the signal/channel may be used for transmission of a random access message (e.g., Msg2, Msg4, MsgB).

In an example, the signal/channel may be used for transmission of a medium access control (MAC) control element (CE). In an example, the MAC CE may be a SP CSI-RS/CSI-IM set activation/deactivation MAC CE. In an example, the MAC CE may be a TCI States Activation/Deactivation for UE-specific PDSCH MAC CE. In an example, the MAC CE may be a TCI State Indication for UE-specific PDCCH MAC CE. In an example, the MAC CE may be a SP ZP CSI-RS Resource Set Activation/Deactivation MAC CE.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a network controlled repeater, a radio and/or core network configuration, a combination thereof and/or alike. For example, an example embodiment may be performed when the one or more conditions are met. Example one or more conditions may be one or more configurations of the wireless device and/or network controlled repeater and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/ or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:

receiving, by a wireless device:

cell discontinuous transmission (DTX) discontinuous reception (DRX) configuration parameters for one or more cells; and a first radio resource control configuration parameter of a first uplink logical channel indicating that arrival of data of the first uplink logical channel triggers a wake up request;

determining, based on the cell DTX DRX configuration parameters, a network energy saving state for the one or more cells;

transmitting, in response to arrival of data of the first uplink logical channel, a wake up request indicating a request to exit the energy saving state for the one or more cells; and wherein:

the wake up request is based on one or more of an uplink control information and an uplink reference signal and a medium access control (MAC) control element (CE) and a random access preamble; and at least one uplink transmission or at least one downlink transmission is not performed during the energy saving state.

2. The method of claim 1, wherein a synchronization signal/physical broadcast channel (SS/PBCH) block (SSB) is not transmitted via the one or more cells during the network energy saving state.

3. The method of claim 1, wherein the transmitting the wake up request is via a physical uplink control channel or a physical uplink shared channel.

4. The method of claim 1, further comprising entering a non-network energy saving state in response to transmitting the wake up request.

5. The method of claim 4, wherein, the at least one uplink transmission or the at least one downlink transmission is performed in response to entering the non-network energy saving state.

6. The method of claim 1, wherein the at least one uplink transmission or the at least one downlink transmission is performed after exiting the energy saving state.

7. The method of claim 1, wherein:

the DTX DRX configuration parameters indicate a pattern; and the determining is based on the pattern.

8. A wireless device comprising:

one or more processors; and memory storing instructions that, when executed by the one or more processors, cause the wireless device to:

receive:

cell discontinuous transmission (DTX) discontinuous reception (DRX) configuration parameters for one or more cells; and a first radio resource control configuration parameter of a first uplink logical channel indicating that arrival of data of the first uplink logical channel triggers a wake up request;

determine, based on the cell DTX DRX configuration parameters, a network energy saving state for the one or more cells;

transmit, in response to arrival of data of the first uplink logical channel, a wake up request indicating a request to exit the energy saving state for the one or more cells; and wherein:

the wake up request is based on one or more of an uplink control information and an uplink reference signal and a medium access control (MAC) control element (CE) and a random access preamble; and at least one uplink transmission or at least one downlink transmission is not performed during the energy saving state.

9. The wireless device of claim 8, wherein a synchronization signal/physical broadcast channel (SS/PBCH) block (SSB) is not transmitted via the one or more cells during the network energy saving state.

10. The wireless device of claim 8, wherein the transmitting the wake up request is via a physical uplink control channel or a physical uplink shared channel.

11. The wireless device of claim 8, further comprising entering a non-network energy saving state in response to transmitting the wake up request.

12. The wireless device of claim 11, wherein, the at least one uplink transmission or the at least one downlink transmission is performed in response to entering the non-network energy saving state.

13. The wireless device of claim 8, wherein the at least one uplink transmission or the at least one downlink transmission is performed after exiting the energy saving state.

14. The wireless device of claim 8, wherein:

the DTX DRX configuration parameters indicate a pattern; and the determining is based on the pattern.

15. A system comprising:

a base station; and a wireless device comprising: one or more processors; and memory storing instructions that, when executed by the one or more processors, cause the wireless device to: receive, from the base station: cell discontinuous transmission (DTX) discontinuous reception (DRX) configuration parameters for one or more cells; and a first radio resource control configuration parameter of a first uplink logical channel indicating that arrival of data of the first uplink logical channel triggers a wake up request; determine, based on the cell DTX DRX configuration parameters, a network energy saving state for the one or more cells; transmit, in response to arrival of data of the first uplink logical channel, a wake up request indicating a request to exit the energy saving state for the one or more cells; and wherein: the wake up request is based on one or more of an uplink control information and an uplink reference signal and a medium access control (MAC) control element (CE) and a random access preamble; and at least one uplink transmission or at least one downlink transmission is not performed during the energy saving state.

16. The system of claim 15, wherein a synchronization signal/physical broadcast channel (SS/PBCH) block (SSB) is not transmitted via the one or more cells during the network energy saving state.

17. The system of claim 15, wherein the transmitting the wake up request is via a physical uplink control channel or a physical uplink shared channel.

18. The system of claim 15, further comprising entering a non-network energy saving state in response to transmitting the wake up request.

19. The system of claim 18, wherein, the at least one uplink transmission or the at least one downlink transmission is performed in response to entering the non-network energy saving state.

20. The system of claim 15, wherein:

the DTX DRX configuration parameters indicate a pattern; and the determining is based on the pattern.

\*　\*　\*　\*　\*